(12) United States Patent
Li et al.

(10) Patent No.: US 11,606,455 B2
(45) Date of Patent: Mar. 14, 2023

(54) METHOD FOR PREVENTING MISTOUCH BY USING TOP-EMITTED PROXIMITY LIGHT, AND TERMINAL

(71) Applicant: Honor Device Co., Ltd., Shenzhen (CN)

(72) Inventors: Chenlong Li, Beijing (CN); Xuanrui Fan, Beijing (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 1 day.

(21) Appl. No.: 17/262,740

(22) PCT Filed: Oct. 21, 2019

(86) PCT No.: PCT/CN2019/112236
§ 371 (c)(1),
(2) Date: Jan. 24, 2021

(87) PCT Pub. No.: WO2020/088289
PCT Pub. Date: May 7, 2020

(65) Prior Publication Data
US 2022/0057888 A1    Feb. 24, 2022

(30) Foreign Application Priority Data
Oct. 30, 2018    (CN) .......................... 201811281063.3

(51) Int. Cl.
*G06F 3/041*    (2006.01)
*H04M 1/72454*    (2021.01)
*H04M 1/02*    (2006.01)

(52) U.S. Cl.
CPC ...... *H04M 1/72454* (2021.01); *G06F 3/0412* (2013.01); *G06F 3/0418* (2013.01);
(Continued)

(58) Field of Classification Search
CPC .. G06F 3/0412; G06F 3/0418; H04M 1/0266; H04M 1/72454
(Continued)

(56) References Cited

U.S. PATENT DOCUMENTS 7,728,316 B2    6/2010    Fadell et al.
7,884,807 B2    2/2011    Hovden et al.
(Continued)

FOREIGN PATENT DOCUMENTS

CN    101807096 A    8/2010
CN    102377871 A    3/2012
(Continued)

OTHER PUBLICATIONS

Baranilingesan, I., "Tilt Angle Detector Using 3-Axis Accelerometer", Feb. 2018, IJSRST, vol. 4, Issue 2, pp. 784-791 (Year: 2018).*

*Primary Examiner* — Kwin Xie
(74) *Attorney, Agent, or Firm* — Conley Rose, P.C.

(57) ABSTRACT

Embodiments provide a proximity sensor located at a side edge of a terminal or a top side edge of the terminal. A first included angle is formed between light emitted by the proximity sensor and a touchscreen of the terminal. The terminal obtains data detected by a motion sensor, and motion data of the terminal based on the data detected by the motion sensor. The terminal determines whether the motion data is less than a first threshold. If the motion data is less than the first threshold, the terminal determines that no external object is currently approaching, and skips performing a mistouch prevention action. If the motion data is greater than or equal to the first threshold, the terminal determines, based on data detected by the proximity sensor, whether an external object is approaching, and determines, based on a determining result, whether to subsequently perform the mistouch prevention action.

18 Claims, 22 Drawing Sheets

(52) U.S. Cl.
CPC . *H04M 1/0266* (2013.01); *G06F 2203/04101* (2013.01); *G06F 2203/04106* (2013.01); *H04M 2250/12* (2013.01)

(58) Field of Classification Search
USPC .................................................. 345/173–174
See application file for complete search history.

(56) References Cited

U.S. PATENT DOCUMENTS

| | | | |
|---|---|---|---|
| 9,146,638 | B2 | 9/2015 | Prushinskiy et al. |
| 9,536,322 | B1 | 1/2017 | Smith et al. |
| 9,563,284 | B2 | 2/2017 | Zhao |
| 9,591,109 | B2 | 3/2017 | Song et al. |
| 10,254,879 | B1 * | 4/2019 | Oral ..................... G06F 3/0446 |
| 10,409,337 | B2 | 9/2019 | Jin |
| 2010/0201822 | A1 | 8/2010 | Ichimura et al. |
| 2012/0154294 | A1 * | 6/2012 | Hinckley .............. G06F 3/0416 |
| | | | 345/173 |
| 2012/0262407 | A1 * | 10/2012 | Hinckley ............ G06F 3/04883 |
| | | | 345/173 |
| 2012/0300436 | A1 | 11/2012 | Hackett |
| 2013/0023312 | A1 | 1/2013 | Staebler |
| 2013/0048837 | A1 | 2/2013 | Pope |
| 2013/0147712 | A1 | 6/2013 | Zhou |
| 2016/0188181 | A1 * | 6/2016 | Smith ................... G06F 3/0412 |
| | | | 715/765 |
| 2016/0248894 | A1 * | 8/2016 | Hosoi ..................... H04M 1/05 |
| 2017/0108206 | A1 | 4/2017 | Li |
| 2017/0134545 | A1 | 5/2017 | Lee et al. |
| 2017/0357376 | A1 * | 12/2017 | Westerman ........... G06F 3/0418 |
| 2018/0260602 | A1 * | 9/2018 | He ..................... A61B 5/14542 |
| 2018/0274758 | A1 | 9/2018 | Robarts |
| 2019/0369755 | A1 * | 12/2019 | Roper .................. G06F 3/0481 |
| 2021/0281673 | A1 | 9/2021 | Li et al. |

FOREIGN PATENT DOCUMENTS

| | | |
|---|---|---|
| CN | 102510423 A | 6/2012 |
| CN | 103369144 A | 10/2013 |
| CN | 103401961 A | 11/2013 |
| CN | 104243646 A | 12/2014 |
| CN | 104284012 A | 1/2015 |
| CN | 204928927 U | 12/2015 |
| CN | 105635462 A | 6/2016 |
| CN | 105892751 A | 8/2016 |
| CN | 106055178 A | 10/2016 |
| CN | 106094990 A | 11/2016 |
| CN | 206223977 U | 6/2017 |
| CN | 107147756 A | 9/2017 |
| CN | 107770315 A | 3/2018 |
| CN | 107948422 A | 4/2018 |
| CN | 108196709 A | 6/2018 |
| CN | 207460260 U | 6/2018 |
| CN | 108509088 A | 9/2018 |
| CN | 209419659 U | 9/2019 |
| EP | 2806331 A1 | 11/2014 |
| EP | 3166229 A1 | 5/2017 |
| JP | 2001305976 A | 11/2001 |
| JP | 2008116249 A | 5/2008 |
| JP | 2016034123 A | 3/2016 |
| KR | 101249960 B1 | 4/2013 |
| KR | 20170105700 A | 9/2017 |
| WO | 2008066645 A2 | 6/2008 |
| WO | 2012025029 A1 | 3/2012 |
| WO | WO-2015191410 A1 * | 12/2015 ............. G06F 3/017 |

* cited by examiner

METHOD FOR PREVENTING MISTOUCH BY USING TOP-EMITTED PROXIMITY LIGHT, AND TERMINAL

CROSS-REFERENCE TO RELATED APPLICATIONS

This application is a National Stage of International Application No. PCT/CN2019/112236, filed on Oct. 21, 2019, which claims priority to Chinese Patent Application No. 201811281063.3, filed on Oct. 30, 2018. Both of the aforementioned applications are hereby incorporated by reference in their entireties.

TECHNICAL FIELD

Embodiments of the present invention relate to terminal technologies, and in particular, to a method for preventing a mistouch by using top-emitted proximity light, and a terminal.

BACKGROUND

With development of terminal products, a screen of a terminal becomes increasingly large. When a user places a large-screen mobile phone near an ear to make a call, a mistouch easily occurs because a face or a head gets in contact with a screen. To prevent a mistouch, a proximity sensor is usually disposed in the mobile phone. During the call, if the proximity sensor detects that an external object is approaching, the mobile phone controls the screen to turn off to prevent a mistouch.

A front surface of a conventional mobile phone includes a front cover and a display screen. The front cover includes a transparent region in the middle and an opaque edge region provided around the transparent region. The display screen is fixed in the transparent region, to perform display by using the transparent region. To accurately detect proximity of an external object, the proximity sensor is usually disposed at the top of the front surface of the mobile phone, and is located in the opaque edge region of the front cover, that is, the proximity sensor emits light to the outside or receives light from the outside through an opening in the opaque edge region. Because the proximity sensor is located in the opaque edge region, it is difficult to reduce a width of the edge region, and a screen-to-body ratio of the terminal is low.

To increase the screen-to-body ratio of the terminal, the proximity sensor needs to be placed at another location in the mobile phone. However, when the proximity sensor is at another location in the mobile phone, infrared light emitted or received by the proximity sensor may not be perpendicular to the screen of the mobile phone. Therefore, a misjudgment may occur when the proximity sensor performs determining on proximity of an external object.

SUMMARY

Embodiments of the present application provide a method for preventing a mistouch by using top-emitted proximity light, and a terminal, to improve accuracy of a function of proximity mistouch prevention.

According to a first aspect, an embodiment of the present application provides a method for proximity mistouch prevention. The method is applied to a terminal including a touchscreen, a proximity sensor, and a motion sensor. The proximity sensor is located at a side edge of the terminal. A first included angle is formed between light emitted by the proximity sensor and the touchscreen. The first included angle is an acute angle. The first included angle may be any angle ranging from 25° to 60°. Specifically, the proximity sensor may be located at a top side edge or a bottom side edge of the terminal or a side edge in another direction. The method includes: The proximity sensor and the motion sensor separately monitor data. The terminal may first obtain data detected by the motion sensor, and obtain motion data of the terminal based on the data detected by the motion sensor. The terminal determines whether the motion data is less than a first threshold. If the motion data is less than the first threshold, the terminal determines that no external object is currently approaching, and skips performing a mistouch prevention operation. To be specific, when the motion data of the terminal is comparatively small, it is considered that the terminal is currently not at a risk of being handheld by a user or being accidentally touched by another object, or it is considered that the terminal is not to be accidentally touched in a current status. In this case, the terminal skips performing a mistouch prevention operation, that is, the terminal does not enable a mistouch prevention interface or does not turn off the screen. If the motion data is greater than or equal to the first threshold, the terminal determines, based on data detected by the proximity sensor, whether an external object is approaching. To be specific, when the motion data of the terminal is comparatively large, it is considered that the terminal may be currently at a risk of being approached by and accidentally touched by an external object. In this case, the terminal determines, based on the data reported by the proximity sensor, whether an object is approaching. If an object is approaching, the terminal performs a mistouch prevention operation. If no object is approaching, the terminal may skip performing a mistouch prevention operation, or may further perform determining on another condition, to further determine whether an external object is approaching.

With reference to the first aspect, in one design manner, in a call screen-off scenario, that is, before the terminal obtains the data detected by the motion sensor, the terminal answers an incoming call or initiates a call in response to a user operation. In this case, the screen of the terminal is in an on state. When determining that the motion data is greater than or equal to the first threshold, in addition to determining, based on the data reported by the proximity sensor, whether an object is approaching, the terminal further determines, based on touch data detected by the touchscreen, whether an external object is approaching. When an object gets in contact with the touchscreen, the touchscreen may detect touch data. For example, when a user holds the terminal near an ear to make a call, the proximity sensor can detect proximity of a head of the user, or the touchscreen can detect touch data of an auricle or a face. In this case, the terminal turns off the screen, to prevent the ear or the face of the user from touching the screen to cause a mistouch. In addition, power consumption can be further reduced.

With reference to the first aspect, in one design manner, after the terminal turns off the screen, the terminal continues to determine, based on the data detected by the proximity sensor and the touch data detected by the touchscreen, whether an external object is approaching or in contact. If either the data detected by the proximity sensor or the data detected by the touchscreen indicates that an external object is approaching or in contact, the terminal keeps the screen off. If both the data detected by the proximity sensor and the data detected by the touchscreen indicate that no external object is approaching or in contact, the terminal turns on the screen. When the terminal determines that an object is far away and the screen needs to be turned on, the terminal may perform a screen-on operation after a delay of a specific time. If the terminal determines again within the delay time that an object is approaching, the terminal remains at a screen-off state. Due to an angle of light emitted by the proximity sensor, an approaching face may not be detected in some scenarios. In these scenarios, if a face gets in contact with the touchscreen, the terminal also performs a mistouch prevention operation, to avoid a mistouch. Therefore, cooperation between the proximity sensor and the touchscreen can improve accuracy of proximity detection, thereby reducing misjudgments.

With reference to the first aspect, in one design manner, in the call screen-off scenario, when determining that the motion data is greater than or equal to the first threshold, in addition to determining, based on the data reported by the proximity sensor and the touch data detected by the touchscreen, whether an object is approaching or in contact, the terminal further determines, based on floating touch data detected by the touchscreen, whether an external object is approaching. When any one of the three pieces of data reports that an object is approaching, the terminal performs a mistouch prevention operation, that is, turns off the screen. When some touchscreens support a floating touch function, proximity of an object may be further detected with reference to floating touch detection of the touchscreens.

With reference to the first aspect, in one design manner, after the terminal turns off the screen, the terminal continues to determine, based on data detected by the proximity sensor, touch data detected by the touchscreen, and floating touch data, whether an external object is approaching or in contact. If any one of the three pieces of data reports that an object is approaching, the terminal keeps the screen off. If all of the three pieces of data report that no object is approaching or in contact, the terminal turns on the screen.

The motion data may include a tilt angle of the terminal, and the tilt angle of the terminal is an included angle between the terminal and a horizontal plane. For example, the tilt angle of the terminal is an included angle between the horizontal plane and a plane at which the terminal is located along a direction of the touchscreen. Alternatively, the tilt angle of the terminal is an included angle between the horizontal plane and a central axis of the terminal along a portrait direction. The first threshold is any angle ranging from 30° to 45°. Alternatively, the motion data may include a motion range of the terminal.

With reference to the first aspect, in one design manner, before the terminal obtains the data detected by the motion sensor, the terminal triggers a pocket mistouch prevention function or a call screen-off function. It should be noted that, after the terminal triggers the pocket mistouch prevention function, if the terminal detects that an object is approaching, the terminal does not respond to an operation on the touchscreen; or if the terminal does not detect that an object is approaching, the terminal remains at a current status. After the terminal triggers the call screen-off function, if the terminal detects that an object is approaching, the terminal turns off the screen; or if the terminal detects that an object is far away (that is, the terminal does not detect that an object is approaching), the terminal turns on the screen.

According to a second aspect, an embodiment of the present application provides a method for preventing a proximity mistouch. The method is applied to a terminal including a touchscreen and a proximity sensor. The proximity sensor is located at a side edge of the terminal. A first included angle is formed between light emitted by the proximity sensor and the touchscreen. The first included angle is an acute angle. In a call screen-off scenario, the terminal determines, based on both touch data detected by the touchscreen and data detected by the proximity sensor, whether an object is approaching. If either of the two pieces of data reports that an object is approaching or in contact, the terminal determines that an object is approaching. If both of the two pieces of data report that an object is far away, the terminal determines that no object is approaching.

In some embodiments, the method provided in the second aspect may be modified as follows: The terminal determines, based on both floating touch data detected by the touchscreen and data detected by the proximity sensor, whether an object is approaching. If either of the two pieces of data reports that an object is approaching or in contact, the terminal determines that an object is approaching. If both of the two pieces of data report that an object is far away, the terminal determines that no object is approaching.

In some embodiments, the method provided in the second aspect may be alternatively modified as follows: The terminal determines, based on all of floating touch data and touch data detected by the touchscreen and data detected by the proximity sensor, whether an object is approaching. If any one of the three pieces of data reports that an object is approaching or in contact, the terminal determines that an object is approaching. If all of the three pieces of data report that an object is far away, the terminal determines that no object is approaching.

According to a third aspect, an embodiment of this application provides an apparatus for preventing a proximity mistouch. The apparatus is included in a terminal. The apparatus has a function of implementing behavior of the terminal in the methods in the first aspect and the second aspect. The function may be implemented by hardware, or may be implemented by hardware executing corresponding software. The hardware or software includes one or more modules corresponding to the function.

According to a fourth aspect, an embodiment of the present application provides a terminal, including a processor, a memory, a touchscreen, a proximity sensor, a motion sensor, and the like. The touchscreen includes a touch-sensitive surface and a display. The proximity sensor is located at a side edge of the terminal. A first included angle is formed between light emitted by the proximity sensor and the touchscreen. The proximity sensor is configured to detect whether an external object is approaching. The motion sensor is configured to detect motion data of the terminal. The memory is configured to store one or more computer programs, and the one or more computer programs include an instruction. When the instruction is executed by the processor, the terminal is enabled to perform the method in any one of the first aspect, the second aspect, or the possible design manners of the first aspect or the second aspect.

According to a fifth aspect, an embodiment of this application provides a computer-readable storage medium, including a computer instruction. When the computer instruction is run on an electronic device, the electronic device is enabled to perform the method in the first aspect, the second aspect, and the possible design manners of the first aspect and the second aspect.

According to a sixth aspect, an embodiment provides a computer program product. When the computer program product runs on a computer, the computer is enabled to perform the method in the first aspect, the second aspect, and the possible design manners of the first aspect and the second aspect.

It can be understood that, for beneficial effects that can be achieved in the second aspect, the third aspect, the fourth aspect, and the fifth aspect, reference may be made to the beneficial effects of the methods provided in the foregoing descriptions. Details are not described herein again.

DESCRIPTION OF EMBODIMENTS

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In the description of embodiments of this application, unless otherwise stated, "a plurality of" means two or more.

The embodiments may be applied to various terminals. In particular, the embodiments of the present application may be applied to a terminal that has a large screen and in which a proximity sensor and the screen are at different planes. For example, the terminal may be a mobile phone, a tablet personal computer, a digital camera, a personal digital assistant (PDA for short), a navigation apparatus, a mobile Internet device (MID), a wearable device (Wearable Device), or an in-vehicle device.

To increase a screen-to-body ratio of the terminal, that is, to increase a proportion of the screen in the front surface of the terminal, the proximity sensor may be placed on a side surface of the terminal. The proximity sensor includes a transmitter, a receiver, and a light source entrance/exit. The transmitter emits infrared light to the outside of the terminal through the light source entrance/exit. The receiver receives infrared light returned from the outside through the light source entrance/exit. That the proximity sensor is disposed on a side surface of the terminal means that the light source entrance/exit of the proximity sensor and the screen are at different planes. That is, the proximity sensor emits and receives infrared light through the side surface of the terminal.

Figure 2A:
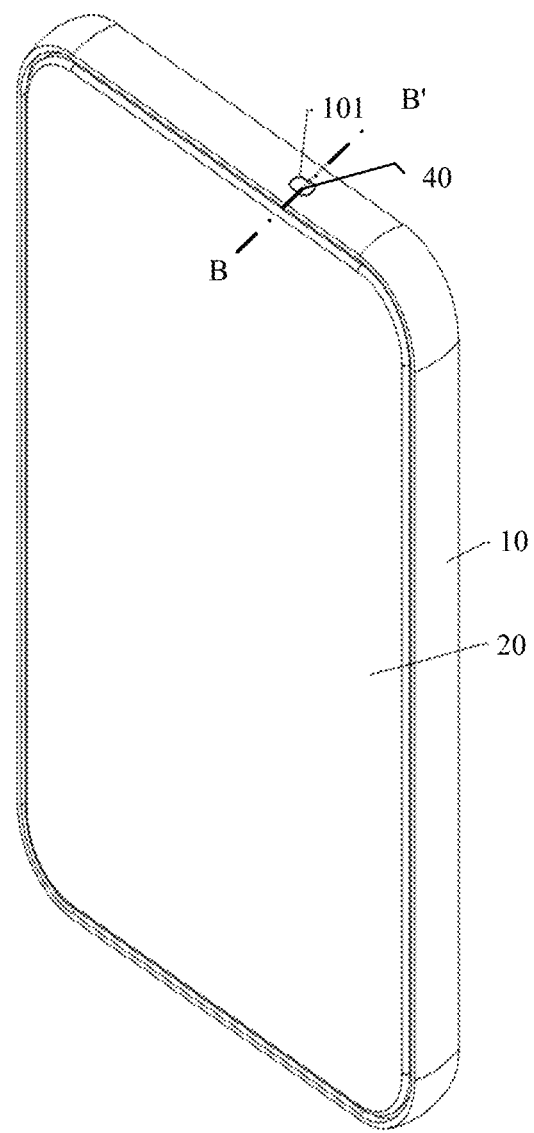
FIG. 2A is a schematic diagram of a terminal according to an embodiment.
Figure 2B:
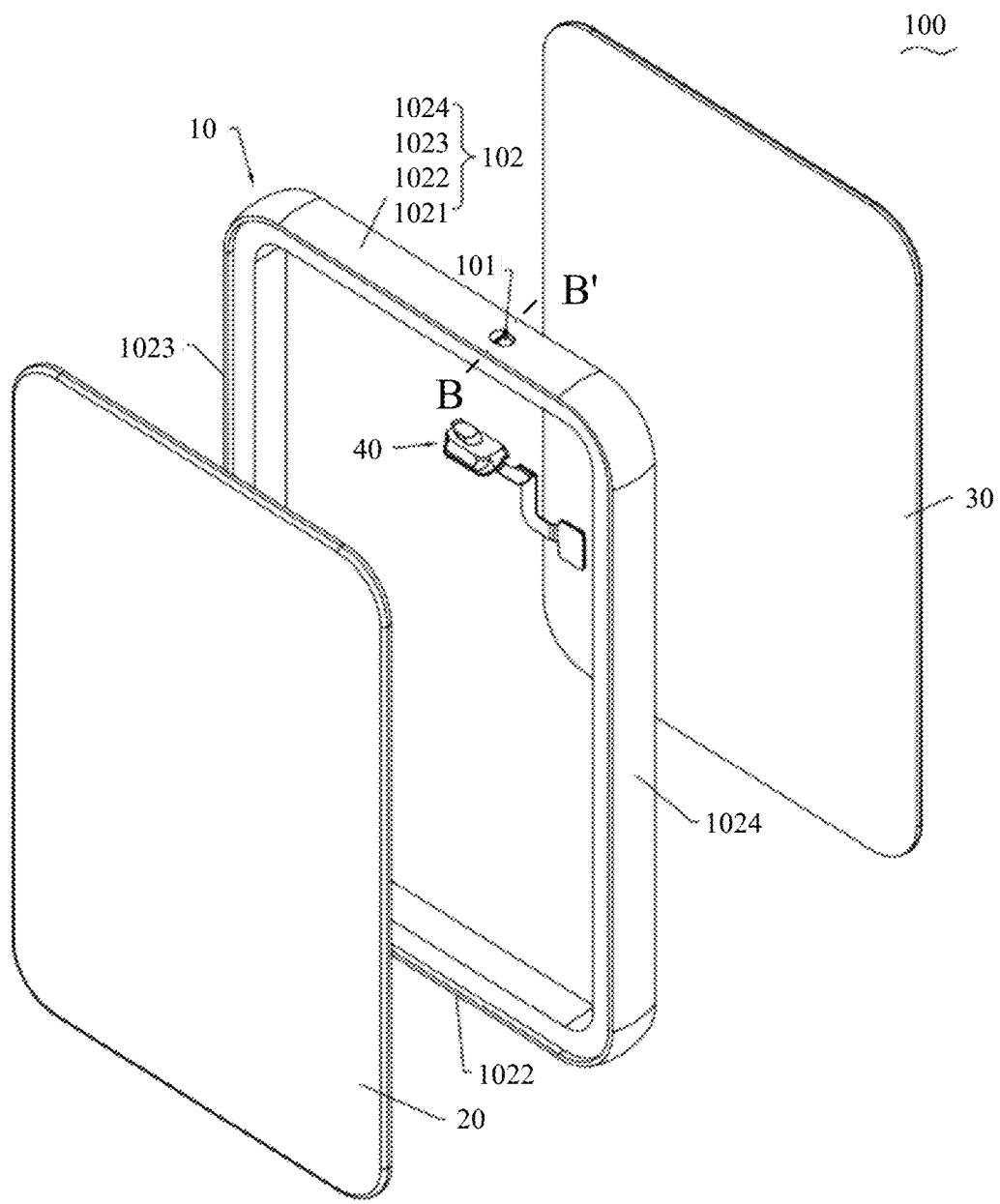
FIG. 2B is a schematic exploded view of a partial structure of a terminal shown in FIG. 2A.

The following describes a location of a proximity sensor in a terminal in the embodiments of this application by using FIG. 2A and FIG. 2B as examples. FIG. 2A is a schematic diagram of a terminal to which solutions in the embodiments of this application are applied. FIG. 2B is a schematic exploded view of a partial structure of the terminal shown in FIG. 2A. As shown in FIG. 2A and FIG. 2B, the terminal 100 includes a bezel 10, a screen 20, a rear cover 30, and a proximity sensor (proximity sensor) 40. The bezel 10 is of an integrated structure, and the bezel 10 has two roughly opposite openings. A periphery of the screen 20 is fixedly connected to the bezel 10. In the embodiments of this application, "being fixedly connected" means that two components remain fixed to each other after being connected. The screen 20 covers one of the openings of the bezel 10. A periphery of the rear cover 30 is fixedly connected to the bezel 10. The rear cover 30 covers the other opening of the bezel 10. The screen 20, the bezel 10, and the rear cover 30 jointly encircle an inner cavity of an entire system. Alternatively, the bezel 10 and the rear cover 30 may be integrated. Alternatively, the bezel 10 and the rear cover 30 may be assembled to form an integrated structure. The proximity sensor 40 is accommodated in the inner cavity of the entire system.

When a user uses the terminal 100, the screen 20 faces the user. A surface that is of the terminal 100 and on which the screen 20 is disposed is considered as the front surface of the terminal 100. A surface that is of the terminal 100 and on which the rear cover 30 is disposed is considered as a rear surface of the terminal 100. An outer surface 102 of the bezel 10 is considered as a peripheral side surface of the terminal 100.

The bezel 10 is provided with a through-hole 101. The through-hole 101 penetrates the bezel 10, to connect inner space (that is, the inner cavity of the entire system) and outer space of the bezel 10 that are opposite to each other. An opening on one side of the through-hole 101 is provided on the outer surface 102 of the bezel 10. The proximity sensor 40 is located on an inner side of the bezel 10 and is partially accommodated in the through-hole 101. A light source entrance/exit of the proximity sensor 40 passes through the through-hole 101, so that the proximity sensor 40 can emit light and receive light through the through-hole 101, thereby implementing a proximity sensing function. The bezel 10 includes a top surface 1021 and a bottom surface 1022 that are provided opposite to each other. The top surface 1021 and the bottom surface 1022 are a part of the outer surface 102 of the bezel 10. The outer surface 102 of the bezel 10 further includes a left side surface 1023 and a right side surface 1024 that are provided opposite to each other. The left side surface 1023 and the right side surface 1024 are connected between the top surface 1021 and the bottom surface 1022. A transition may be performed between the top surface 1021 and the right side surface 1024 by using an arc surface. A transition may be performed between the right side surface 1024 and the bottom surface 1022 by using an arc surface. A transition may be performed between the bottom surface 1022 and the left side surface 1023 by using an arc surface. A transition may be performed between the left side surface 1023 and the top surface 1021 by using an arc surface.

When the user uses the terminal 100, the top surface 1021 is roughly upward, the bottom surface 1022 is roughly downward, the left side surface 1023 is close to a left hand side of the user, and the right side surface 1024 is close to a right hand side of the user.

A location of the through-hole 101 is not limited in this embodiment of this application. The through-hole 101 may be located on the top surface 1021 of the bezel 10, or may be located on another surface of an bezel 10, for example, the bottom surface 1022, the left side surface 1023, or the right side surface 1024. The top surface 1021 is a top side surface of the terminal. When the through-hole is located on the top surface 1021, light emitted by the proximity sensor is emitted from the top, and may be referred to as top-emitted proximity light. In this embodiment of this application, proximity light is not necessarily emitted from the top, and may be alternatively emitted from another side surface. Usually, a light emitting location in the proximity sensor is a location of the through-hole, and is usually determined by a location of an earpiece. For example, when the earpiece is at the top of the terminal, the light emitting location in the proximity sensor may be provided on the top side surface. When the earpiece is at the bottom of the terminal, the light emitting location in the proximity sensor may be provided on a bottom side surface.

Figure 3A:
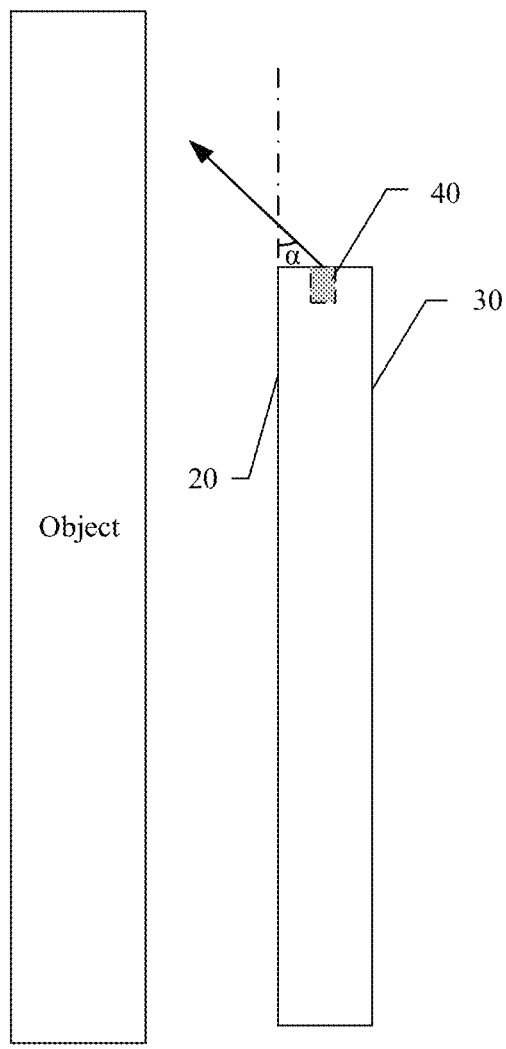
FIG. 3A, FIG. 3B, and FIG. 3C are schematic working diagrams of a proximity sensor according to an embodiment.
Figure 3B:
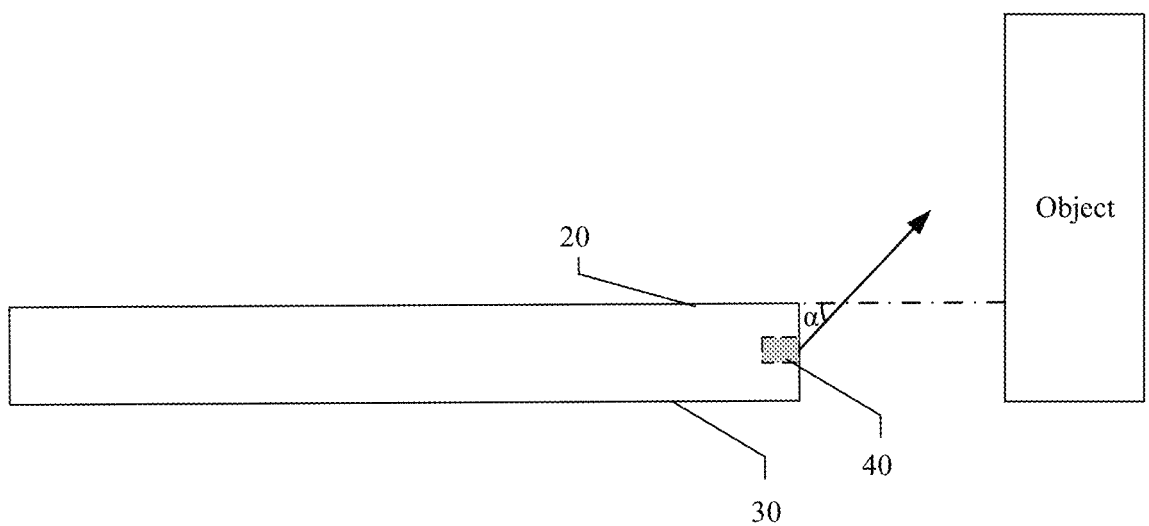
Figure 3C:
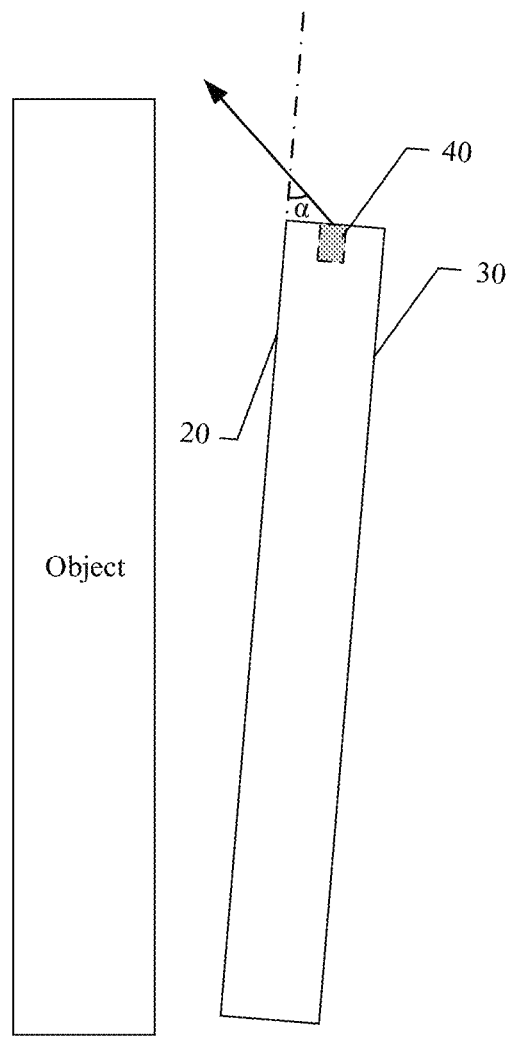

FIG. 3A, FIG. 3B, and FIG. 3C are schematic working diagrams of a proximity sensor according to an embodiment of this application. As shown in FIG. 3A, emergent light emitted by the proximity sensor 40 and a plane on which the screen 20 is located form an included angle α, which may be referred to as a first included angle α (which may also be referred to as a front tilt angle). To detect proximity of an object to the front surface of the terminal, the first included angle is usually required to be greater than 25°, and In some embodiments, may be greater than 45°. Certainly, a larger first included angle indicates a better detection effect. When the first included angle is close to 90°, this is similar to a case in which the proximity sensor is disposed on the front surface of the terminal. However, because the proximity sensor is disposed on a side surface of the terminal, the first included angle can hardly reach 90°.

Figure 3D:
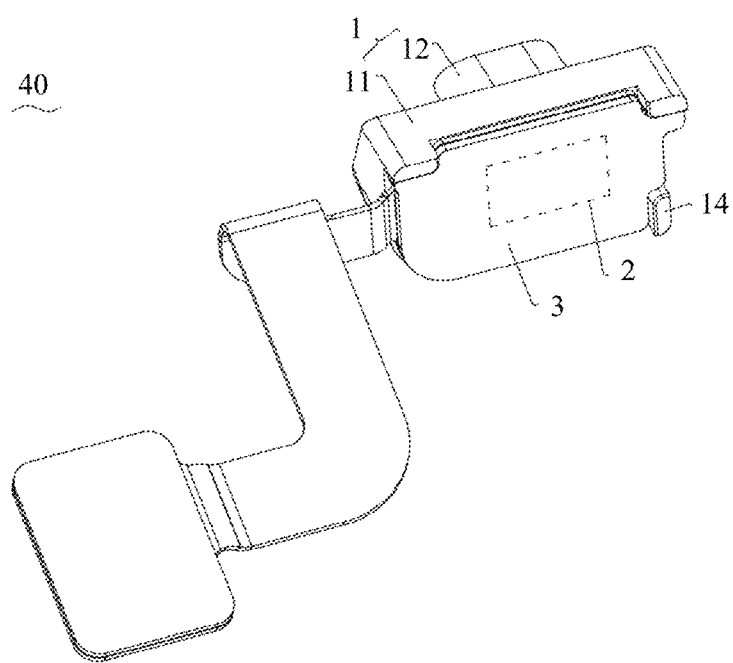
FIG. 3D is a schematic structural diagram of a proximity sensor according to an embodiment of this application.
Figure 3E:
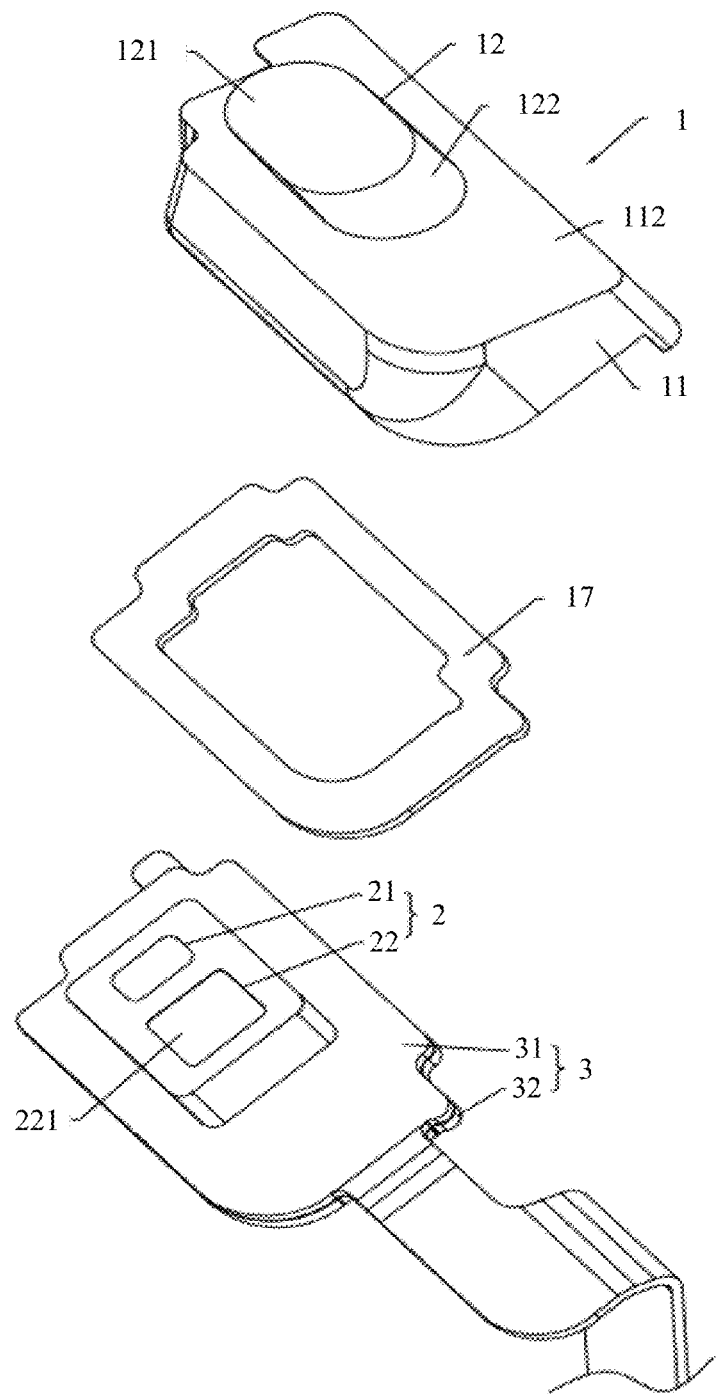
FIG. 3E is a schematic exploded structural diagram of a proximity sensor shown in FIG. 3D.
Figure 3F:
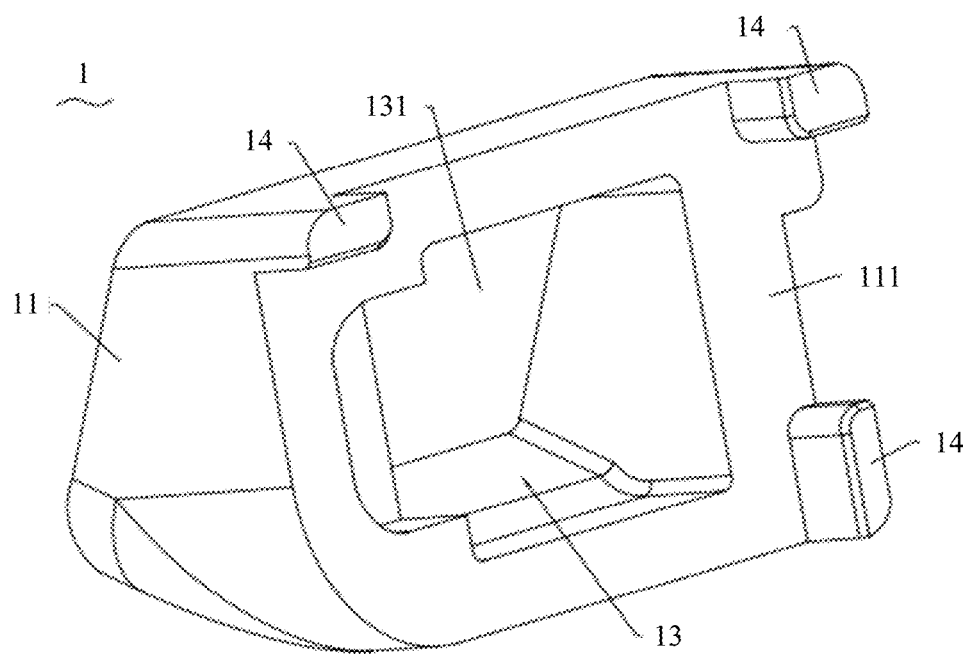
FIG. 3F is a schematic structural diagram of a lampshade in FIG. 3E.
Figure 3G:
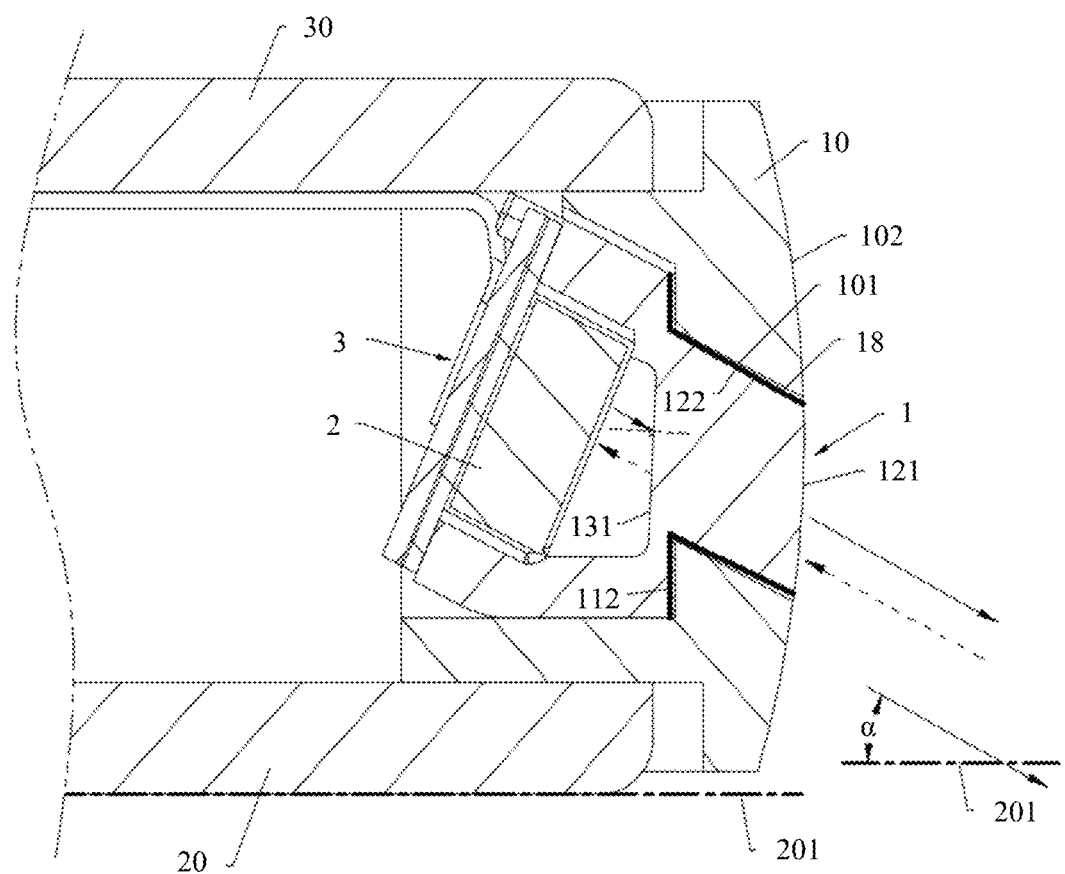
FIG. 3G is a sectional view of a partial structure of a terminal shown in FIG. 2A and FIG. 2B along a line B-B'.

An example structure of the proximity sensor is not limited in this embodiment of this application, provided that the first included angle can be formed between the light emitted by the proximity sensor and the plane on which the screen 20 is located. For example, FIG. 3D, FIG. 3E, FIG. 3F, and FIG. 3G show a structure of a proximity sensor. FIG. 3D is a schematic structural diagram of a proximity sensor. FIG. 3E is a schematic exploded structural diagram of the proximity sensor shown in FIG. 3D. FIG. 3F is a schematic structural diagram of a lampshade in FIG. 3E. FIG. 3G is a sectional view of a partial structure of the terminal shown in FIG. 2A and FIG. 2B along a line B-B'.

With reference to FIG. 3D to FIG. 3G, the proximity sensor includes a lampshade 1, a proximity light assembly 2, and a circuit board 3.

The proximity sensor 40 includes the lampshade 1, the proximity light assembly 2, and the circuit board 3. The lampshade 1 is equivalent to the light source entrance/exit in the foregoing embodiment. Alternatively, a first surface 121 of the lampshade 1 is equivalent to the light source entrance/exit in the foregoing embodiment.

The lampshade 1 includes a fixed portion 11 and an embedded portion 12 that is fixedly connected to the fixed portion 11. The fixed portion 11 and the embedded portion 12 may be integrated. An end face 111 that is of the fixed portion 11 and that is away from the embedded portion 12 is provided with a concave mounting slot 13. The proximity light assembly 2 is fixed on the circuit board 3. The circuit board 3 is fixed on the end face 111 that is of the fixed portion 11 and that is away from the embedded portion 12, and covers the mounting slot 13. The proximity light assembly 2 is accommodated in the mounting slot 13. In other words, a concave cavity is formed on a side that is of the fixed portion 11 and that is away from the embedded portion 12, and the proximity light assembly 2 is accommodated in the cavity. The circuit board 3 covers the mounting slot 13, so that the proximity light assembly 2 can be connected to the lampshade 1 in a sealed manner. A sealing ring 17 may be further disposed between the fixed portion 11 and the circuit board 3, to improve sealing performance. The sealing ring 17 may be double-sided tape or a glue layer.

An end face that is of the embedded portion 12 and that is away from the fixed portion 11 includes the first surface 121. A bottom wall of the mounting slot 13 includes a second surface 131. Light emitted by the proximity light assembly 2 may pass through the second surface 131 and the first surface 121, and then be emitted from the proximity sensor 40. Light outside the proximity sensor 40 may pass through the first surface 121 and the second surface 131, and then enter the proximity light assembly 2.

In this embodiment, because the proximity light assembly 2 is accommodated in the mounting slot 13 and the proximity light assembly 2 is roughly embedded in the lampshade 1, utilization of light can be improved. The lampshade 1 may also protect a structure of the proximity light assembly 2. In addition, the terminal 100 may be modularized by assembling the proximity light assembly 2 and the lampshade 1, to simplify an overall assembly process of the terminal 100.

The first surface 121 may be a part of the end face that is of the embedded portion 12 and that is away from the fixed portion 11, or may be all of the end face that is of the embedded portion 12 and that is away from the fixed portion 11. When the proximity sensor 40 is mounted on the bezel 10 (referring to FIG. 3A), the lampshade 1 is located on an inner side of the bezel 10 and is partially accommodated in the through-hole 101. A part or all of the embedded portion 12 is accommodated in the through-hole 101. The first surface 121 is exposed outside the terminal 100 through an opening of the through-hole 101. In this embodiment of this application, the first surface 121 is entirety of the end face that is of the embedded portion 12 and that is away from the fixed portion 11. In other words, the first surface 121 covers the entire end face that is of the embedded portion 12 and that is away from the fixed portion 11. The end face is exposed outside the terminal 100 through an opening of the through-hole 101. In this case, the entire end face can receive light or transmit light, thereby improving utilization of the end face. In addition, an area of an opening that is of the through-hole 101 and that is provided on the outer surface 102 of the bezel 10 may also be correspondingly set to a comparatively small value. The fixed portion 11 is located on an inner side of the bezel 10. For example, the fixed portion 11 may be accommodated in or partially accommodated in a groove 103 on an inner side of the bezel 10. The groove 103 may be used to accommodate and limit the fixed portion 11. The second surface 131 may be a part of a bottom wall of the mounting slot 13 of the fixed portion 11.

In an implementation, the fixed portion 11 includes a fixing surface 112. The embedded portion 12 is located on the fixing surface 112. The embedded portion 12 is a protrusion portion disposed on the fixing surface 112. The embedded portion 12 includes a limiting surface 122. The limiting surface 122 is connected between the fixing surface 112 and the end face that is of the embedded portion 12 and that is away from the fixed portion 11. That is, the limiting surface 122 is connected between the fixing surface 112 and the first surface 121. The limiting surface 122 is a peripheral side surface of the embedded portion 12. When the embedded portion 12 is partially or completely accommodated in the through-hole 101, the limiting surface 122 is provided facing a hole wall of the through-hole 101. A shape of the hole wall of the through-hole 101 adapts to a shape of the limiting surface 122.

In an implementation, the proximity light assembly 2 includes a transmitter 21 and a receiver 22. The transmitter 21 is configured to emit light. The emitted light may be invisible light such as infrared light. The transmitter 21 may be a light emitting diode (LED) or a vertical-cavity surface-emitter laser (VCSEL). The receiver 22 is configured to receive induced light and form a corresponding electrical signal. The emitted light passes through the lampshade 1 to form emergent light. The emergent light is reflected by an obstacle to form emitted light. A part of the reflected light passes through the lampshade 1 to form induced light. In this implementation, both the transmitter 21 and the receiver 22 are accommodated in the mounting slot 13. The receiver 22 of the proximity light assembly 2 has an induction surface 221, and the induction surface 221 is configured to receive the induced light. A direction of the emitted light emitted by the transmitter 21 is roughly perpendicular to the induction surface 221. The proximity light assembly 2 is fixed at one end of the circuit board 3, and the other end of the circuit board 3 may be used for mounting a connector.

In an implementation, the circuit board 3 may include a body 31 and a reinforcing piece 32. The body 31 may be a flexible printed circuit board. The reinforcing piece 32 is configured to reinforce strength of a part of the body 31. For example, the reinforcing piece 32 may cover a part that is of the body 31 and that is used to cover the groove 103, that is, the body 31 includes the part that covers the groove 103, and the reinforcing piece 32 covers the part, so that the circuit board 3 can be better fixed and sealed to the lampshade 1.

In an implementation, the lampshade 1 includes one or more positioning rods 14. The one or more positioning rods 14 are convexly disposed on the end face 111 that is of the fixed portion 11 and that is away from the embedded portion 12. The one or more positioning rods 14 are configured to position the circuit board 3, so that assembly precision of the circuit board 3 and the lampshade 1 is comparatively high. As shown in FIG. 3D, a part of the circuit board 3 is located in space limited by a plurality of positioning rods 14, and the circuit board 3 abuts against the plurality of positioning rods 14.

As shown in FIG. 3G, the proximity light assembly 2 emits light to the outside or receives light from the outside through the lampshade 1. The light emitted by the proximity light assembly 2 faces the screen 20, and the light is emitted through the lampshade 1. Based on different lampshade structures, the lampshade 1 may change a direction of emergent light (not shown in the figure). A first included angle α is formed between the light emitted by the lampshade 1 and the screen 20.

It should be noted that FIG. 3D to FIG. 3G are merely examples of a structure of a proximity sensor, and this structure is not limited in this embodiment of this application.

Because the first included angle of the proximity sensor 40 can hardly reach 90°, a misjudgment may occur in some application scenarios. Examples are as follows.

Scenario 1: When an object approaches the terminal from another direction (not the front), the object may be detected by the proximity sensor, thereby causing a misjudgment. For example, as shown in FIG. 3B, when an object approaches from the top of the terminal, the screen of the terminal is actually not to be accidentally touched. In this case, the proximity sensor does not need to report a proximity event. However, due to the first included angle, the proximity sensor may detect the object at the top, thereby causing a misjudgment of proximity. For example, the scenario 1 may be a scenario in which an object approaches from the top of the terminal when the terminal is placed on a desktop or another plane, or a scenario in which the terminal is in a horizontal state and the top of the terminal is close to another obstacle region when a user finishes a call by using the terminal and puts the terminal away from an ear, or a scenario in which a user holds the terminal with a hand and a front side of the user's body is close to an obstacle.

Scenario 2: Although an object approaches the terminal from the front, the proximity sensor may not detect the object due to existence of the first included angle, and therefore cannot report proximity of the object, thereby also causing a misjudgment. For example, as shown in FIG. 3C, when an object approaches the terminal from the front, the screen of the terminal is very likely to be accidentally touched. In this case, the proximity sensor needs to report a proximity event. However, due to the first included angle, the proximity sensor may not detect proximity of the object, thereby causing a misjudgment. For example, the scenario 2 may be as follows: When a user uses the terminal to make a call, if a face of the user is comparatively large, the face may be in contact with a lower part of the screen of the terminal, and there is still a specific distance between an ear and the top of the terminal. In this scenario, light emitted by the proximity sensor may not reach the user's head. Alternatively, when a user uses the terminal to make a call, if the top of the terminal is right at an edge of an auricle, because a human head is round, if the human head needs to be detected, the first included angle of the proximity sensor needs to be comparatively large. When the first included angle of the proximity sensor is not sufficiently large, the proximity sensor may not detect proximity of an object.

The solution of preventing a proximity mistouch that is provided in this embodiment of this application is used to mitigate the foregoing possible misjudgment. In this embodiment of this application, the motion sensor cooperates with the proximity sensor, or the proximity sensor cooperates with the touchscreen, or the motion sensor, the proximity sensor, and the touchscreen cooperate with each other to jointly perform proximity detection. For example, if it is detected, by using the motion sensor, that the terminal is located at a plane (or an approximate plane) or a motion range of the terminal is very small, it may be considered that the terminal is not close to an ear of a user at this time, and therefore it may be reported that no object is approaching (or an object is far away). If it is detected, by using the touchscreen, that an ear or a face of a user is in contact with the screen, it may be reported that an object is approaching. The motion sensor may detect a posture, an angle, or a motion status of the terminal.

Figure 1:
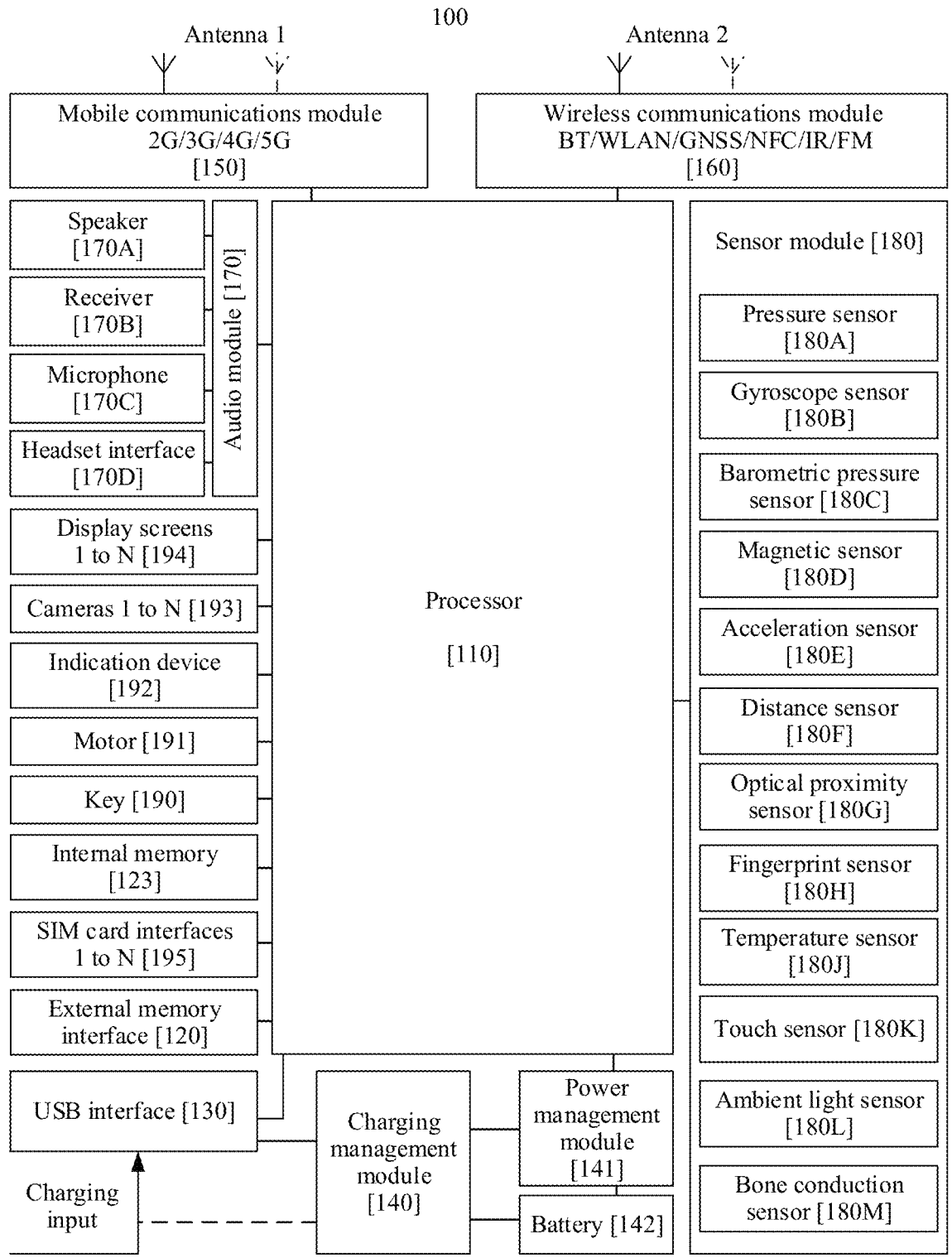
FIG. 1 is a schematic structural diagram of a terminal according to an embodiment of this application.

A specific form of the terminal is not particularly limited in the embodiments of this application. For example, FIG. 1 is a schematic structural diagram of a terminal 100 according to an embodiment of this application.

The terminal 100 may include a processor 110, an external memory interface 120, an internal memory 123, a universal serial bus (USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset interface 170D, a sensor module 180, a key 190, a motor 191, an indication device 192, a camera 193, a display screen 194, a subscriber identity module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, a proximity sensor 180G, a fingerprint sensor 180H, a temperature sensor 180J, a touch sensor 180K, an ambient light sensor 180L, a bone conduction sensor 180M, a direction sensor, and the like.

It can be understood that the structure shown in this embodiment of the present application does not constitute a specific limitation on the terminal 100. In some other embodiments of this application, the terminal 100 may include more or fewer components than those shown in the figure, or some components may be combined, or some components may be split, or there may be a different component layout. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, and/or a neural-network processing unit (NPU). Different processing units may be separate devices, or may be integrated into one or more processors.

The controller may be a nerve center and a command center of the terminal 100. The controller may generate an operation control signal based on an instruction operation code and a time sequence signal, to control obtaining of an instruction and execution of the instruction.

A memory may be further disposed in the processor 110 to store an instruction and data. In some embodiments, the memory in the processor 110 is a cache. The memory may store an instruction or data just used or cyclically used by the processor 110. If the processor 110 needs to use the instruction or the data again, the processor 110 may directly invoke the instruction or the data from the memory. This avoids repeated access and reduces a waiting time of the processor 110, thereby improving system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a two-way synchronous serial bus, including a serial data line (SDA) and a serial clock line (SCL). In some embodiments, the processor 110 may include a plurality of I2C buses. The processor 110 may be coupled to the touch sensor 180K, a charger, a flash, the camera 193, and the like separately by using different I2C bus interfaces. For example, the processor 110 may be coupled to the touch sensor 180K by using an I2C interface, so that the processor 110 communicates with the touch sensor 180K by using the I2C bus interface, to implement a touch function of the terminal 100.

The I2S interface may be used for audio communication. In some embodiments, the processor 110 may include a plurality of I2S buses. The processor 110 may be coupled to the audio module 170 by using an I2S bus, to implement communication between the processor 110 and the audio module 170. In some embodiments, the audio module 170 may transmit an audio signal to the wireless communications module 160 by using the I2S interface, to implement a function of answering a call by using a Bluetooth headset.

The PCM interface may also be used for audio communication, to sample, quantize, and encode an analog signal. In some embodiments, the audio module 170 may be coupled to the wireless communications module 160 by using the PCM bus interface. In some embodiments, the audio module 170 may also transmit an audio signal to the wireless communications module 160 by using the PCM interface, to implement a function of answering a call by using a Bluetooth headset. Both the I2S interface and the PCM interface may be used for audio communication.

The UART interface is a universal serial data bus used for asynchronous communication. The bus may be a two-way communications bus. The bus converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 by using the UART interface, to implement a Bluetooth function. In some embodiments, the audio module 170 may transmit an audio signal to the wireless communications module 160 by using the UART interface, to implement a function of playing music by using a Bluetooth headset.

The MIPI interface may be configured to connect the processor 110 to a peripheral device such as the display screen 194 or the camera 193. The MIPI interface includes a camera serial interface (CSI), a display serial interface (DSI), and the like. In some embodiments, the processor 110 communicates with the camera 193 by using the CSI interface, to implement a photographing function of the terminal 100; and the processor 110 communicates with the display screen 194 by using the DSI interface, to implement a display function of the terminal 100.

The GPIO interface may be configured by using software. The GPIO interface may be configured as a control signal, or may be configured as a data signal. In some embodiments, the GPIO interface may be configured to connect the processor 110 to the camera 193, the display screen 194, the wireless communications module 160, the audio module 170, the sensor module 180, or the like. The GPIO interface may be alternatively configured as an I2C interface, an I2S interface, a UART interface, an MIPI interface, or the like.

The USB interface 130 is an interface that complies with a USB standard specification, and may be specifically a mini USB interface, a micro USB interface, a USB Type C interface, or the like. The USB interface 130 may be configured to connect to a charger to charge the terminal 100, or may be configured to transmit data between the terminal 100 and a peripheral device, or may be configured to connect to a headset to play an audio file by using the headset. Alternatively, the interface may be configured to connect to another electronic device, for example, an AR device.

It can be understood that an interface connection relationship between the modules shown in this embodiment of the present application is merely an example for description, and does not constitute a limitation on a structure of the terminal 100. In some other embodiments of this application, the terminal 100 may alternatively use an interface connection manner different from that in the foregoing embodiment, or use a combination of a plurality of interface connection manners.

The charging management module 140 is configured to receive charging input from a charger. The charger may be a wireless charger, or may be a wired charger. In some embodiments of wired charging, the charging management module 140 may receive charging input from a wired charger by using the USB interface 130. In some embodiments of wireless charging, the charging management module 140 may receive wireless charging input by using a wireless charging coil of the terminal 100. When the charging management module 140 charges the battery 142, the power management module 141 may further supply power to the electronic device.

The power management module 141 is configured to connect to the battery 142, the charging management module 140, and the processor 110. The power management module 141 receives input from the battery 142 and/or the charging management module 140, and supplies power to the processor 110, the internal memory 123, an external memory, the display screen 194, the camera 193, the wireless communications module 160, and the like. The power management module 141 may be further configured to monitor parameters such as a battery capacity, a quantity of battery cycles, and a battery health status (electric leakage and impedance). In some other embodiments, the power management module 141 may be alternatively disposed in the processor 110. In some other embodiments, the power management module 141 and the charging management module 140 may be alternatively disposed in a same device.

A wireless communication function of the terminal 100 may be implemented by the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the terminal 100 may be configured to cover one or more communication frequency bands. Different antennas may be further multiplexed to improve antenna utilization. For example, the antenna 1 may be multiplexed as a diversity antenna of a wireless local area network. In some other embodiments, an antenna may be used in combination with a tuning switch.

The mobile communications module 150 may provide a solution that is applied to the terminal 100 and that includes wireless communications technologies such as 2G, 3G, 4G, and 5G. The mobile communications module 150 may include at least one light filter, a switch, a power amplifier, a low noise amplifier (LNA), and the like. The mobile communications module 150 may receive an electromagnetic wave by using the antenna 1, perform processing such as filtering and amplification on the received electromagnetic wave, and transmit a processed electromagnetic wave to the modem processor for demodulation. The mobile communications module 150 may further amplify a signal modulated by the modem processor, and convert an amplified signal into an electromagnetic wave and radiate the electromagnetic wave by using the antenna 1. In some embodiments, at least some functional modules of the mobile communications module 150 may be disposed in the processor 110. In some embodiments, at least some functional modules of the mobile communications module 150 and at least some modules of the processor 110 may be disposed in a same device.

The modem processor may include a modulator and a demodulator. The modulator is configured to modulate a to-be-sent low-frequency baseband signal into an intermediate- or high-frequency signal. The demodulator is configured to demodulate a received electromagnetic wave signal into a low-frequency baseband signal. Then the demodulator transmits the low-frequency baseband signal obtained through demodulation to the baseband processor for processing. The low-frequency baseband signal is processed by the baseband processor, and a processed signal is transmitted to the application processor. The application processor outputs a sound signal by using an audio device (not limited to the speaker 170A, the receiver 170B, and the like), or displays an image or a video by using the display screen 194. In some embodiments, the modem processor may be an independent device. In some other embodiments, the modem processor may be independent of the processor 110, and is disposed in a same device with the mobile communications module 150 or another functional module.

The wireless communications module 160 may provide a solution that is applied to the terminal 100 and that includes wireless communications technologies such as a wireless local area network (WLAN) (for example, a wireless fidelity (Wi-Fi) network), Bluetooth (BT), a global navigation satellite system (GNSS), frequency modulation (FM), a near field communication (NFC) technology, and an infrared (IR) technology. The wireless communications module 160 may be one or more devices that integrate at least one communications processing module. The wireless communications module 160 receives an electromagnetic wave by using the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave and radiate the electromagnetic wave by using the antenna 2.

In some embodiments, the antenna 1 of the terminal 100 is coupled to the mobile communications module 150, and the antenna 2 is coupled to the wireless communications module 160, so that the terminal 100 may communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite-based augmentation system (SBAS).

The terminal 100 implements a display function by using the GPU, the display screen 194, the application processor, and the like. The GPU is a microprocessor for image processing, and is connected to the display screen 194 and the application processor. The GPU is configured to perform mathematical and geometric calculation, and is used for graphics rendering. The processor 110 may include one or more GPUs that execute a program instruction to generate or change display information.

The display screen 194 is configured to display an image, a video, and the like. The display screen 194 includes a display panel. The display panel may be a liquid crystal display (LCD), an organic light-emitting diode (OLED), an active-matrix organic light-emitting diode (AMOLED), a flexible light-emitting diode (FLED), a mini LED, a micro LED, a micro OLED, a quantum dot light-emitting diode (QLED), or the like. In some embodiments, the terminal 100 may include one or N display screens 194, where N is a positive integer greater than 1.

The terminal 100 may implement a photographing function by using the ISP, the camera 193, the video codec, the GPU, the display screen 194, the application processor, and the like.

The ISP is configured to process data fed back by the camera 193. For example, during photographing, a shutter is opened, light is transmitted to a photosensitive element of the camera through a lens, an optical signal is converted into an electrical signal, and the photosensitive element of the camera transmits the electrical signal to the ISP for processing, to convert the electrical signal into an image visible to a naked eye. The ISP may further optimize noise, luminance, and complexion of the image based on an algorithm. The ISP may further optimize parameters such as exposure and color temperature of a photographing scenario. In some embodiments, the ISP may be disposed in the camera 193.

The camera 193 is configured to capture a static image or a video. An optical image is generated for an object by using the lens, and the optical image is projected to the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal in an RGB format, a YUV format, or the like. In some embodiments, the terminal 100 may include one or N cameras 193, where N is a positive integer greater than 1.

The digital signal processor is configured to process a digital signal. In addition to a digital image signal, the digital signal processor may further process another digital signal. For example, when the terminal 100 selects a frequency, the digital signal processor is configured to perform Fourier transformation and the like on frequency energy.

The video codec is configured to compress or decompress a digital video. The terminal 100 may support one or more types of video codecs. In this way, the terminal 100 may play or record videos in a plurality of encoding formats, for example, moving picture experts group (MPEG)-1, MPEG-2, MPEG-3, and MPEG-4.

The NPU is a neural-network (NN) computing processor. The NPU quickly processes input information with reference to a structure of a biological neural network, for example, with reference to a transfer mode between human brain neurons, and may further continuously perform self-learning. The NPU may implement applications such as intelligent cognition of the terminal 100, for example, image recognition, facial recognition, speech recognition, and text comprehension.

The external memory interface 120 may be configured to connect to an external storage card, for example, a micro SD card, to extend a storage capability of the terminal 100. The external storage card communicates with the processor 110 by using the external memory interface 120, to implement a data storage function. For example, files such as music and videos are stored in the external storage card.

The internal memory 123 may be configured to store computer executable program code, where the executable program code includes an instruction. The processor 110 performs various functional applications and data processing of the terminal 100 by running the instruction stored in the internal memory 123. The internal memory 123 may include a program storage area and a data storage area. The program storage area may store an operating system, an application program required by at least one function (for example, a sound play function or an image play function), and the like. The data storage area may store data (for example, audio data and a phone book) created in a process of using the terminal 100, and the like. In addition, the internal memory 123 may include a high-speed random access memory, or may include a nonvolatile memory, for example, at least one magnetic disk storage device, a flash storage device, or a universal flash storage (universal flash storage, UFS).

The terminal 100 may implement audio functions, for example, music playing and recording, by using the audio module 170, the speaker 170A, the receiver 170B, the microphone 170C, the headset interface 170D, the application processor, and the like.

The audio module 170 is configured to convert digital audio information into an analog audio signal for output, and is also configured to convert analog audio input into a digital audio signal. The audio module 170 may be further configured to encode and decode an audio signal. In some embodiments, the audio module 170 may be disposed in the processor 110, or some functional modules of the audio module 170 are disposed in the processor 110.

The speaker 170A, also referred to as a "loudspeaker", is configured to convert an audio electrical signal into a sound signal. The terminal 100 may be used to listen to music or answer a hands-free call by using the speaker 170A.

The receiver 170B, also referred to as an "earpiece", is configured to convert an audio electrical signal into a sound signal. When the terminal 100 is used to answer a call or listen to voice information, the receiver 170B may be placed close to a human ear to listen to a voice.

The microphone 170C, also referred to as a "mike" or a "mic", is configured to convert a sound signal into an electrical signal. When making a call or sending voice information, a user may move a mouth close to the microphone 170C and make a sound, to input a sound signal into the microphone 170C. At least one microphone 170C may be disposed in the terminal 100. In some other embodiments, two microphones 170C may be disposed in the terminal 100, to implement a noise reduction function, in addition to collecting a sound signal. In some other embodiments, three, four, or more microphones 170C may be alternatively disposed in the terminal 100, to collect a sound signal and reduce noise. The microphones 170C may further identify a sound source, implement a directional recording function, and the like.

The headset interface 170D is configured to connect to a wired headset. The headset interface 170D may be a USB interface 130, or may be a 3.5-mm open mobile terminal platform (OMTP) standard interface or a cellular telecommunications industry association of the USA (CTIA) standard interface.

The pressure sensor 180A is configured to sense a pressure signal, and may convert the pressure signal into an electrical signal. In some embodiments, the pressure sensor 180A may be disposed in the display screen 194. There are many types of pressure sensors 180A, for example, a resistive pressure sensor, an inductive pressure sensor, and a capacitive pressure sensor. The capacitive pressure sensor may include at least two parallel plates that have conductive materials. When a force acts on the pressure sensor 180A, capacitance between electrodes changes. The terminal 100 determines pressure strength based on the capacitance change. When a touch operation acts on the display screen 194, the terminal 100 detects strength of the touch operation based on the pressure sensor 180A. The terminal 100 may also calculate a touch position based on a detection signal of the pressure sensor 180A. In some embodiments, touch operations acting on a same touch position but having different touch operation strength may correspond to different operation instructions. For example, when a touch operation whose touch operation strength is less than a first pressure threshold acts on an icon of an SMS application, an instruction for viewing an SMS message is executed; or when a touch operation whose touch operation strength is greater than or equal to the first pressure threshold acts on the icon of the SMS application, an instruction for creating an SMS message is executed.

The gyroscope sensor 180B may be configured to determine a motion posture of the terminal 100. In some embodiments, an angular velocity of the terminal 100 around three axes (that is, an x-axis, a y-axis, and a z-axis) may be determined by using the gyroscope sensor 180B. The gyroscope sensor 180B may be used for image stabilization during photographing. For example, when the shutter is pressed, the gyroscope sensor 180B detects an angle at which the terminal 100 shakes, and calculates, based on the angle, a distance for which a lens module needs to compensate, so that the lens cancels the shake of the terminal 100 through reverse motion, thereby implementing image stabilization. The gyroscope sensor 180B may be further used in navigation and motion sensing game scenarios.

The barometric pressure sensor 180C is configured to measure barometric pressure. In some embodiments, the terminal 100 calculates an altitude by using a barometric pressure value measured by the barometric pressure sensor 180C, to assist in positioning and navigation.

The magnetic sensor 180D includes a Hall effect sensor. The terminal 100 may detect opening/closing of a clamshell leather case by using the magnetic sensor 180D. In some embodiments, when the terminal 100 is a clamshell phone, the terminal 100 may detect opening/closing of a clamshell based on the magnetic sensor 180D. Further, a feature, such as automatic unlocking upon flipping, is set based on a detected open/closed state of a leather case or a detected open/closed state of the clamshell.

The acceleration sensor 180E may detect a magnitude of an acceleration of the terminal 100 in each direction (usually, three axes). When the terminal 100 is still, a magnitude and a direction of gravity may be detected. The acceleration sensor 180E may be further configured to identify a posture of the electronic device, and is applied to applications such as landscape/portrait mode switching and a pedometer. A tilt angle of the terminal may be calculated by using data detected by the acceleration sensor, that is, an included angle between a horizontal plane and a plane at which the screen of the terminal is located may be calculated.

The distance sensor 180F is configured to measure a distance. The terminal 100 may measure a distance by using an infrared or laser technology. In some embodiments, in a photographing scenario, the terminal 100 may measure a distance by using the distance sensor 180F, to implement fast focusing.

The proximity sensor 180G (equivalent to the proximity sensor 40 in other embodiments) may include, for example, a light emitting diode (LED) and an optical detector, for example, a photodiode. The light emitting diode may be an infrared light emitting diode. The terminal 100 emits infrared light by using the light emitting diode. The terminal 100 detects, by using the photodiode, infrared reflected light that comes from a nearby object. When detecting sufficient reflected light, the terminal 100 may determine that there is an object near the terminal 100; or when detecting insufficient reflected light, the terminal 100 may determine that there is no object near the terminal 100. The terminal 100 may detect, by using the proximity sensor 180G, that a user holds the terminal 100 close to an ear for a call, to automatically turn off the screen to save power and prevent a mistouch. The proximity sensor 180G may also be used for automatic screen locking or unlocking in a leather case mode or a pocket mode, that is, a mistouch prevention mode.

The ambient light sensor 180L is configured to sense luminance of ambient light. The terminal 100 may adaptively adjust luminance of the display screen 194 based on the sensed luminance of ambient light. The ambient light sensor 180L may also be configured to automatically adjust white balance during photographing. The ambient light sensor 180L may further cooperate with the proximity sensor 180G to detect whether the terminal 100 is in a pocket, to prevent a mistouch.

The fingerprint sensor 180H is configured to collect a fingerprint. The terminal 100 may implement fingerprint-based unlocking, unlocking for application access, fingerprint-based photographing, fingerprint-based call answering, and the like by using a collected fingerprint characteristic.

The temperature sensor 180J is configured to detect temperature. In some embodiments, the terminal 100 executes a temperature processing policy by using the temperature detected by the temperature sensor 180J. For example, when temperature reported by the temperature sensor 180J exceeds a threshold, the terminal 100 degrades performance of a processor near the temperature sensor 180J, to reduce power consumption and implement thermal protection. In some other embodiments, when temperature is lower than another threshold, the terminal 100 heats up the battery 142 to avoid abnormal shutdown of the terminal 100 due to low temperature. In some other embodiments, when temperature is lower than still another threshold, the terminal 100 boosts an output voltage of the battery 142 to avoid abnormal shutdown due to low temperature.

The touch sensor 180K is also referred to as a "touch panel". The touch sensor 180K may be disposed in the display screen 194, and a touchscreen includes the touch sensor 180K and the display screen 194, which is also referred to as a touch control screen. The touch sensor 180K is configured to detect a touch operation acting on or near the touch sensor. The touch sensor may transmit the detected touch operation to the application processor, to determine a type of a touch event. Visual output related to the touch operation may be provided by using the display screen 194. In some other embodiments, the touch sensor 180K may be alternatively disposed on a surface of the terminal 100, and is at a position different from that of the display screen 194. Some touch sensors 180K have a floating touch function. To be specific, when an external object is approaching but has not got in contact with the touchscreen, these touch sensors can detect proximity of the external object, that is, detect the floating object. The touchscreen is equivalent to the screen 20 in other embodiments.

The bone conduction sensor 180M may obtain a vibration signal. In some embodiments, the bone conduction sensor 180M may obtain a vibration signal from a vibration bone of a human voice part. The bone conduction sensor 180M may also be in contact with a human pulse, and receive a blood pressure and pulse signal. In some embodiments, the bone conduction sensor 180M may be alternatively disposed in a headset to form a bone conduction headset. The audio module 170 may parse out a speech signal based on the vibration signal obtained by the bone conduction sensor 180M from the vibration bone of the voice part, to implement a speech function. The application processor may parse out heart rate information based on the blood pressure and pulse signal obtained by the bone conduction sensor 180M, to implement a heart rate detection function.

The key 190 includes a power key, a volume key, or the like. The key 190 may be a mechanical key, or may be a touch key. The terminal 100 may receive key input, and generate key signal input related to user settings and function control of the terminal 100.

The motor 191 may produce a vibration prompt. The motor 191 may be configured to produce a vibration prompt for an incoming call, or may be configured to produce a vibration feedback on a touch. For example, touch operations acting on different applications (for example, photographing and audio playing) may correspond to different vibration feedback effects. For touch operations acting on different regions on the display screen 194, the motor 191 may also correspondingly produce different vibration feedback effects. Different application scenarios (for example, a time reminder, information receiving, an alarm clock, and a game) may also correspond to different vibration feedback effects. A touch vibration feedback effect may be further customized.

The indication device 192 may be an indicator, and may be configured to indicate a charging status and a battery level change, or may be configured to indicate a message, a missed call, a notification, or the like.

The SIM card interface 195 is configured to connect to a SIM card. The SIM card may be inserted in the SIM card interface 195 or removed from the SIM card interface 195, to implement contact with or separation from the terminal 100. The terminal 100 may support one or N SIM card interfaces, where N is a positive integer greater than 1. The SIM card interface 195 may support a nano-SIM card, a micro-SIM card, a SIM card, and the like. A plurality of cards may be inserted in one SIM card interface 195. The plurality of cards may be of a same type, or may be of different types. The SIM card interface 195 may also be compatible with different types of SIM cards. The SIM card interface 195 may also be compatible with an external storage card. The terminal 100 interacts with a network by using the SIM card, to implement functions such as a call and data communication. In some embodiments, the terminal 100 uses an eSIM, that is, an embedded SIM card. The eSIM card may be embedded in the terminal 100, and cannot be separated from the terminal 100.

Figure 4:
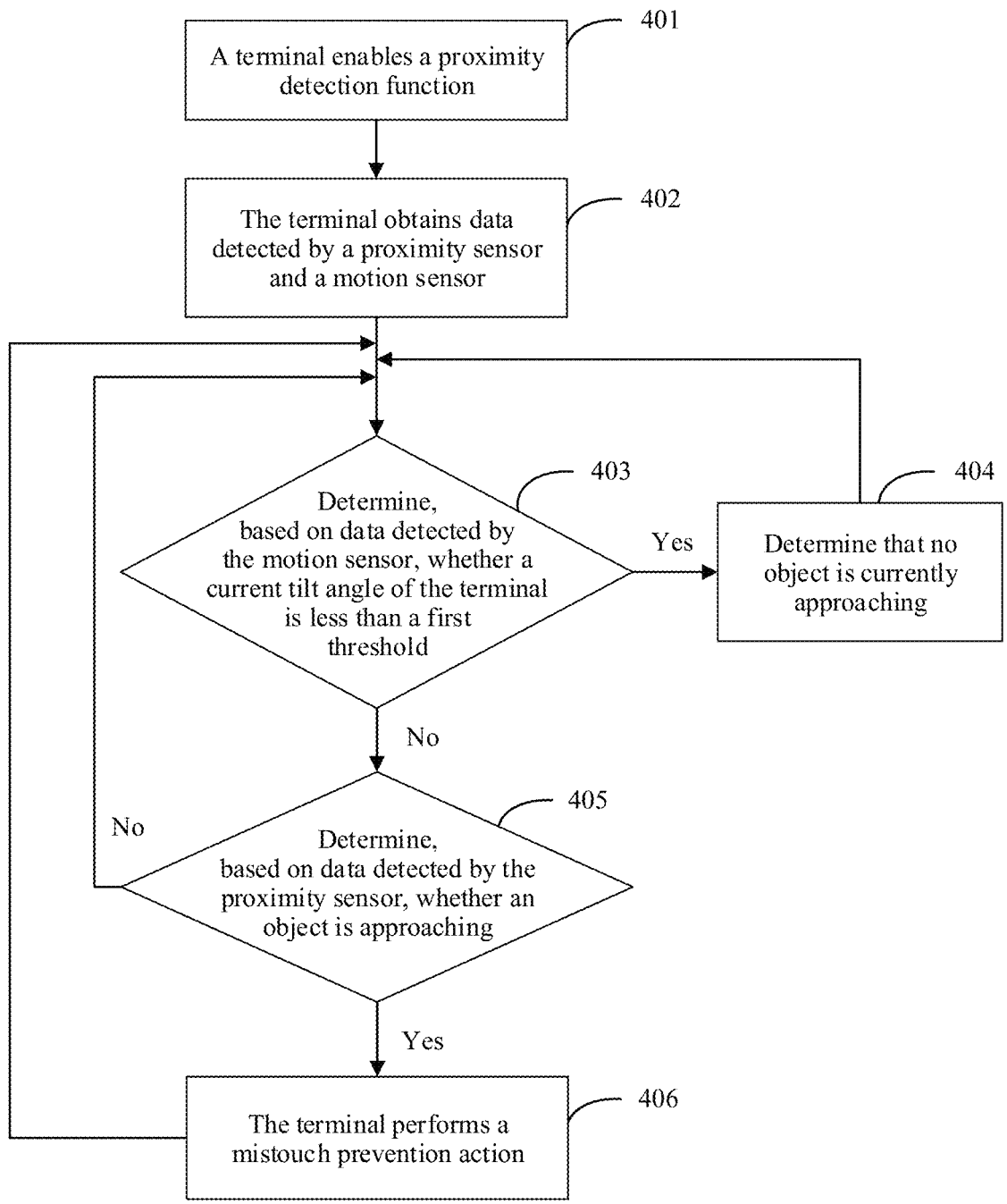
FIG. 4 is a flowchart of a method for preventing a proximity mistouch according to an embodiment.
Figure 6:
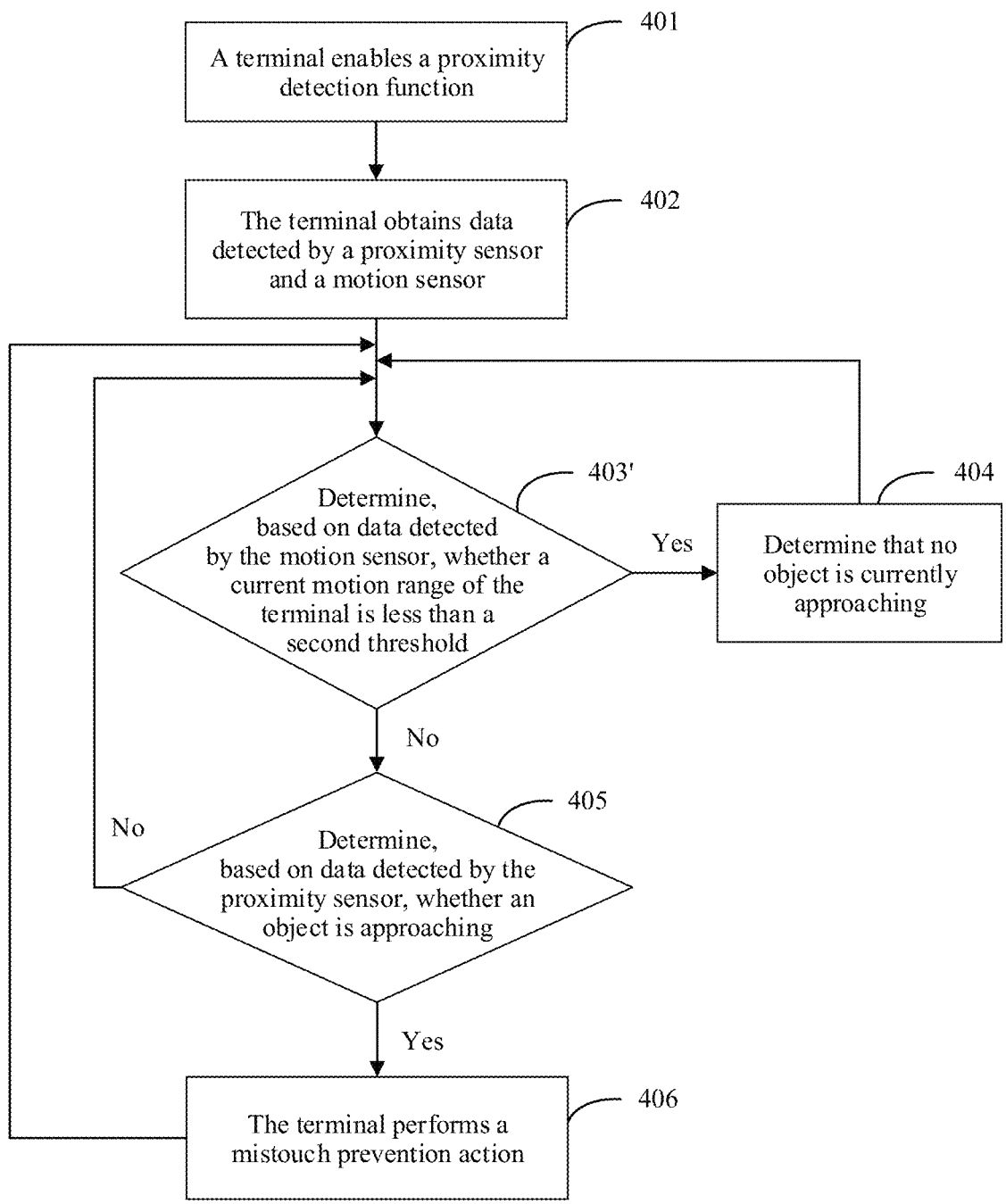
FIG. 6 is a flowchart of another method for preventing a proximity mistouch according to an embodiment.

The following describes the solutions of this application by using specific embodiments. It should be noted that all steps in embodiments shown in FIG. 4 and FIG. 6 are performed in a pocket mistouch prevention scenario or a call screen-off scenario. In other words, if a terminal currently does not trigger a pocket mistouch prevention function or a call screen-off function, the terminal does not perform a method in an embodiment shown in FIG. 4 or FIG. 6.

Triggering, by the terminal, the pocket mistouch prevention function may include: The terminal enables an option for the pocket mistouch prevention function (the option is usually enabled by a user or enabled by default), and triggers the pocket mistouch prevention function when a screen of the terminal is turned on in a lock-screen state or a screen-off state. If the terminal does not enable the option for the pocket mistouch prevention function, that is, a user manually disables the option for the function, the terminal does not have the pocket mistouch prevention function in this case. In addition, even if the terminal enables the option for the pocket mistouch prevention function, if the terminal is in an unlocked state or a screen-on state, that is, the terminal does not change from a lock-screen state or a screen-off state to a screen-on state, the terminal does not trigger the pocket mistouch prevention function.

Usually, the terminal supports the call screen-off function by default, and a user does not need to manually select the function. Triggering, by the terminal, the call screen-off function may include: When the terminal answers an incoming call (usually when a user taps an "Answer" key) in response to a user operation, the terminal triggers the call screen-off function. Alternatively, when the terminal makes a call (usually when a user taps a "Dial" key) in response to a user operation, the terminal triggers the call screen-off function. If the terminal allows the user to manually enable or disable the call screen-off function, after the user selects to enable the call screen-off function, the terminal triggers the call screen-off function when answering an incoming call or making a call.

FIG. 4 is a flowchart of a method for preventing a proximity mistouch according to an embodiment of this application. In the solution of this embodiment, proximity detection is mainly implemented through cooperation between a motion sensor and a proximity sensor. This can effectively avoid the misjudgment described in the foregoing scenario 1. A terminal to which this embodiment is applied includes a proximity sensor and a motion sensor. The motion sensor may include one or more sensors, for example, an acceleration sensor, a gyroscope, and a direction sensor. As shown in FIG. 4, the method may include the following steps.

Step 401: The terminal enables a proximity detection function.

The terminal may enable the proximity detection function in a plurality of conditions. For example, these conditions may be as follows. Condition 1: The terminal answers an incoming call in response to a user operation. Condition 2: The terminal initiates a call as a calling party in response to a user operation. Condition 3: The terminal triggers a pocket mistouch prevention function. This may be specifically as follows: The terminal enables the pocket mistouch prevention function, and detects that a screen of the terminal is turned on in a lock-screen state and the terminal receives a touch operation, or detects that a screen of the terminal is turned on in a lock-screen state. Condition 4: In addition to a call application and a pocket mistouch prevention application, another application that needs to use proximity data is enabled. When any one of the foregoing conditions is met, the terminal may enable the proximity detection function. A condition for enabling the proximity detection function is not limited in this embodiment of this application. Proximity data may need to be used on the terminal in a plurality of cases. When proximity data needs to be used, the terminal may enable the proximity detection function. It should be noted that, because a plurality of applications on the terminal may need to use proximity data, after one of the applications is enabled, the terminal enables the proximity detection function and starts to obtain proximity data. After the proximity detection function is enabled, if another application that needs to use the proximity detection function is enabled, because the proximity detection function is already enabled, the application may directly read the proximity data, and the terminal does not need to perform an action of enabling the proximity detection function again.

The pocket mistouch prevention function is as follows: When the terminal is located in a pocket or a bag, if the screen of the terminal in a lock-screen state or a screen-off state is turned on (for example, the screen is turned on by pressing a power key or by using another operation) and the terminal receives a touch operation on the screen, the terminal enables the mistouch prevention function, that is, the terminal does not respond to the touch operation, to prevent the terminal from being accidentally touched.

The conditions 1 and 2 are related to a call screen-off scenario. Call screen-off means that, when the terminal answers an incoming call or initiates a call as a calling party, if the terminal detects that an external object is approaching (usually when a user picks up the terminal and places it near an ear), the terminal turns off the screen, to prevent the screen from being accidentally touched by the ear or a face of the user, and reduce power consumption of the terminal; or if the terminal detects that an external object is far away (usually when a user takes the terminal away from an ear), the terminal turns on the screen, so that the user can operate the touchscreen.

Step 402: After the proximity detection function is enabled, the terminal obtains data detected by the proximity sensor and the motion sensor.

The proximity sensor or the motion sensor may have been enabled before step 401, or may be enabled in step 401. An occasion at which these sensors are enabled is not limited in this application. After step 401, the terminal obtains data detected by the proximity sensor and data detected by the motion sensor.

Step 403: The terminal determines, based on the data detected by the motion sensor, whether a current tilt angle of the terminal is less than a first threshold, and performs step 404 if the tilt angle is less than the first threshold, or performs step 405 if the tilt angle is greater than or equal to the first threshold.

Figure 5A:
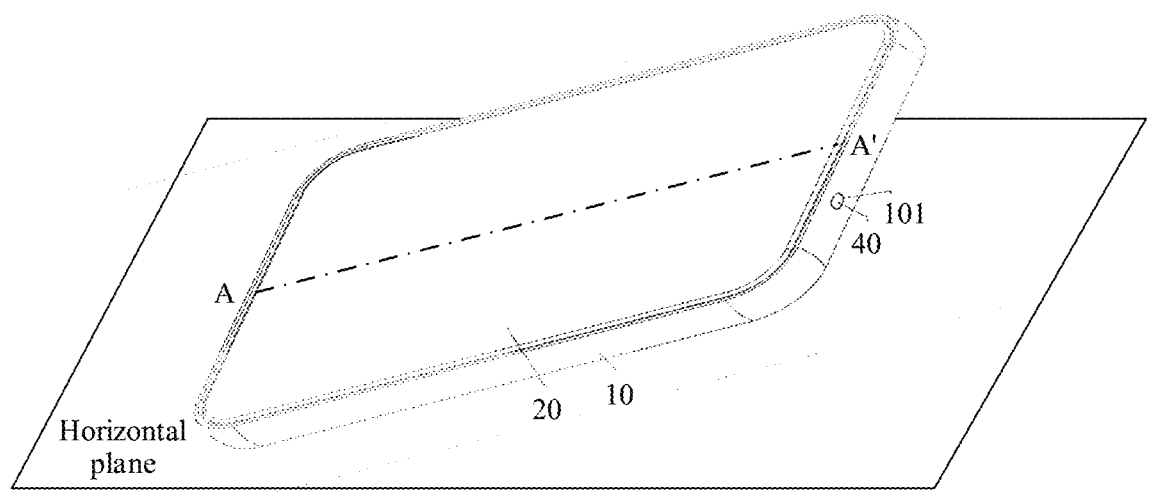
FIG. 5A, FIG. 5B, and FIG. 5C are schematic diagrams of an included angle between a terminal and a horizontal plane according to an embodiment.
Figure 5B:
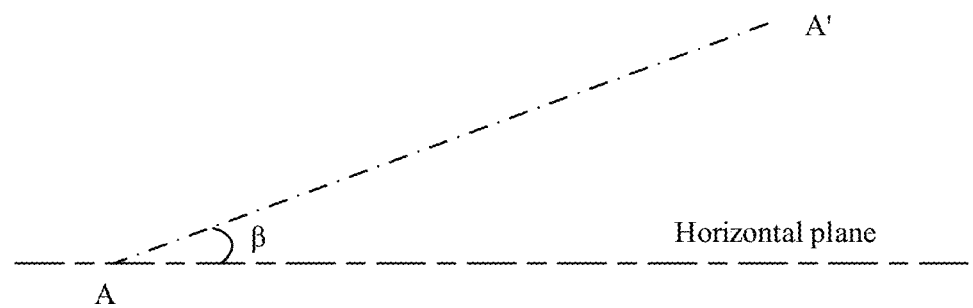

The tilt angle of the terminal is an included angle between the terminal and a horizontal plane, for example, an included angle between the horizontal plane and a plane at which the terminal is located along a direction of the screen, or an included angle between the horizontal plane and a central axis of the terminal. FIG. 5A is a schematic diagram of the included angle between the terminal and the horizontal plane, where AA' is the central axis of the terminal. As shown in FIG. 5B, an included angle between the central axis AA' and the horizontal plane is the tilt angle. It should be noted that the terminal usually has two central axes, where one is along a portrait direction, and the other is along a landscape direction. However, the central axis in this embodiment of this application is usually the central axis along the portrait direction (as shown in FIG. 5B), because an earpiece of the terminal is usually located at the top along the portrait direction. In other words, a direction of the central axis described in this embodiment of this application is related to a location of the earpiece. If the earpiece of the terminal is located at the top or bottom along the portrait direction, the central axis along the portrait direction is selected. If the earpiece of the terminal is located at the top or bottom along the landscape direction, a central axis along the landscape direction is selected. For example, the first threshold may be set to 30°, 40°, or 45°, or may be set to another value ranging from 30° to 45°.

The tilt angle of the terminal may be calculated by using the data detected by the motion sensor.

Step 404: The terminal determines that no object is currently approaching, and then repeats step 403 to perform, in real time, determining on data detected by the motion sensor.

It should be noted that, when performing determining on the data detected by the motion sensor in step 403, the terminal may also perform determining on data detected by the proximity sensor. However, provided that the data detected by the motion sensor indicates that a current tilt angle of the terminal is less than the first threshold, it may be considered that a result reported by a current sensor (including the motion sensor and the proximity sensor) is that no object is approaching or an object is far away.

When a user picks up the terminal and places the terminal near an ear to answer a call, a conventional posture of holding the terminal by the user is that a head (top) of the terminal is far away from ground, and a tail of the terminal is close to the ground. In this case, a tilt angle of the terminal is usually comparatively large. Therefore, if the tilt angle of the terminal is comparatively small, it is usually considered that the terminal is not picked up and placed near an ear. In this case, if the screen of the terminal is turned off due to a misjudgment, user experience is affected. For example, when a mobile phone is placed on a desktop, if an object is approaching from the top of the mobile phone, the proximity sensor may detect proximity of the object. In this case, because the tilt angle of the mobile phone is almost 0 (less than the first threshold), the terminal determines that no object is approaching, thereby avoiding a false positive. Therefore, when the tilt angle of the terminal is comparatively small, the terminal determines that no object is currently approaching, thereby avoiding a misjudgment.

Figure 5C:
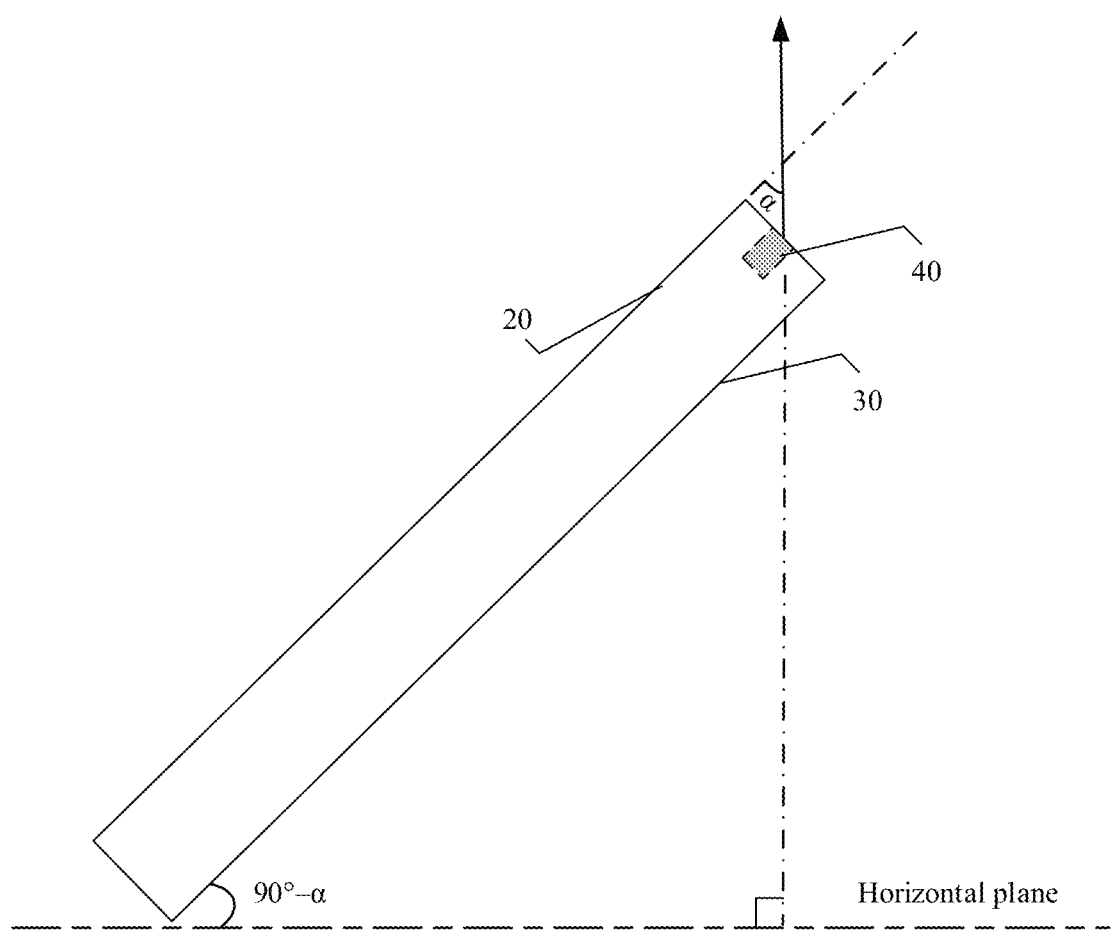

In addition, for a value of the first threshold, refer to a first included angle α of the proximity sensor of the terminal. In this embodiment of this application, there is an included angle (the first included angle α) between an optical direction of the proximity sensor and a direction of the screen of the terminal. Therefore, when the terminal tilts to a specific angle, an optical emission direction of the proximity sensor is toward a direction of the sky (for example, perpendicular to the horizontal plane and upward). In a scenario in which emergent light emitted by the proximity sensor is irradiated into the sky, a misjudgment usually does not occur. Therefore, the tilt angle of the terminal may be set to the first threshold in the scenario. For example, as shown in FIG. 5C, the first included angle of the terminal is a, and the first threshold β may be set as follows: β=90°−α. If the first included angle α is 50°, the first threshold may be set to 40°.

When the motion sensor detects that the tilt angle is small, the terminal may reduce sensitivity of the proximity sensor, so that a status reported by the proximity sensor is always being far away, and the terminal determines that no object is currently approaching. Alternatively, when the motion sensor detects that the tilt angle is small, the terminal may not read the data detected by the proximity sensor, but directly identifies a current status as that no object is approaching.

It should be noted that the determining, by the terminal, that no external object is currently approaching does not mean that the terminal necessarily performs a determining action, but means that the terminal performs a processing procedure corresponding to that no external object is approaching. For example, in a pocket mistouch prevention scenario, if the terminal determines that no external object is currently approaching, the terminal does not display a mistouch prevention interface; in a call screen-off scenario, if the terminal determines that no external object is currently approaching, the terminal does not turn off the screen.

Step 405: The terminal determines, based on the data detected by the proximity sensor, whether an object is approaching, and performs step 406 if an object is approaching, or repeats step 403 if no object is approaching.

When the tilt angle of the terminal is greater than or equal to the first threshold, it is considered that current data detected by the proximity sensor is accurate. Therefore, the terminal determines, based on the data detected by the proximity sensor, whether an object is approaching. That is, if the tilt angle of the terminal is comparatively large, the terminal is likely to have been picked up. In this case, whether an object is approaching needs to be determined based on the data of the proximity sensor.

Step 406: The terminal performs a mistouch prevention action. For example, in a call screen-off scenario, the terminal turns off the screen, to prevent the screen from being accidentally touched; in a pocket mistouch prevention scenario, the terminal does not respond to a current touch operation, to prevent a mistouch.

Figure 5D:
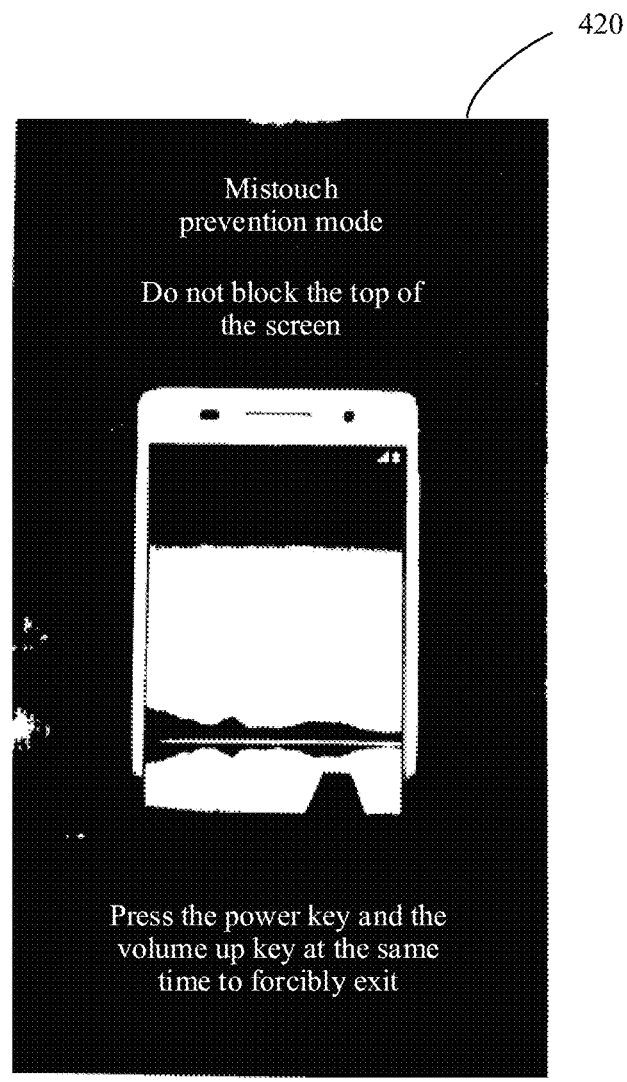
FIG. 5D is a schematic diagram of a mistouch prevention interface according to an embodiment.

As shown in FIG. 5D, in the pocket mistouch prevention scenario, the performing a mistouch prevention action by the terminal may be: displaying an interface 420 on the screen, and skipping responding to a current touch operation on the screen. The interface 420 is in a mistouch prevention mode. When the interface is displayed, no response is given to a touch operation performed by a user on the interface. In some embodiments, the interface 420 may prompt the user as follows: "Do not block the top of the screen." If the user accidentally blocks the top of the screen, the user may unblock the top of the screen after viewing the prompt. In some embodiments, the interface 420 may alternatively prompt the user as follows: "Press the power key and the volume up key at the same time to forcibly exit."

Turning off the screen not only can prevent a mistouch, but also can save power.

After step 406, step 403 is repeated. In the call screen-off scenario, when step 403 is repeated, if it is determined that step 404 needs to be performed, the terminal turns on the screen when determining that no object is currently approaching, so that the user can see and operate the screen.

It should be noted that steps 403, 404, and 405 may be specifically implemented in a plurality of manners. For example, in a manner, determining may be first performed on motion data of the terminal, and if the tilt angle is less than the first threshold, it may be directly determined that an object is far away, or if the tilt angle is greater than or equal to the first threshold, determining is performed again based on the data of the proximity sensor. In a second manner, motion data of the terminal and the proximity data of the proximity sensor may be converged for processing. The second manner may be specifically as follows: The terminal may be configured with virtual proximity sensors of different sensitivity. In addition, a mistouch prevention solution and a proximity screen-off solution may be separately configured. For example, the terminal may configure a virtual sensor A, a virtual sensor B, and a virtual sensor C. The three virtual sensors are specific to same proximity sensor hardware, but separately correspond to different determining thresholds, to achieve different sensitivity statuses. The virtual sensor C has no sensitivity, that is, a limit threshold is set for a status of the sensor to ensure that a reported status is always being far away (that is, no object is approaching). The virtual sensor B has medium sensitivity, and a threshold is set for the sensor, so that only an object very close to the sensor is reported as being approaching, that is, sensitivity is medium. The virtual sensor A has high sensitivity, and a threshold is set for the sensor, so that sensitivity of the sensor is higher than that of the virtual sensor B. During detection, the three virtual sensors simultaneously report detected statuses, and flexibly perform switching and distinguishing by using an upper-layer interface and with reference to data detected by the motion sensor. For example, in the proximity screen-off solution, if the motion sensor detects that the tilt angle is less than the first threshold, an upper-layer application invokes data reported by the virtual sensor C, to learn of a status that an object is far away; or if the motion sensor detects that the tilt angle is greater than or equal to the first threshold, an upper-layer application invokes data reported by the virtual sensor A, and determines, based on the high-sensitivity data detected by the virtual sensor A, whether an object is approaching. In the pocket mistouch prevention solution, if the motion sensor detects that the tilt angle is less than the first threshold, an upper-layer application invokes data reported by the virtual sensor C, to learn of a status that an object is far away; or if the motion sensor detects that the tilt angle is greater than or equal to the first threshold, an upper-layer application invokes data reported by the virtual sensor B, and determines, based on the medium-sensitivity data detected by the virtual sensor B, whether an object is approaching. Because the pocket mistouch prevention solution requires lower sensitivity than that required by the proximity screen-off solution, the medium-sensitivity virtual sensor B may be used in the pocket mistouch prevention solution. Certainly, alternatively, only the virtual sensor A and the virtual sensor C may be disposed. In this case, the virtual sensor A replaces the virtual sensor B in the pocket mistouch prevention solution.

In another implementation, the motion sensor may detect a motion range of the terminal, and the terminal performs proximity determining based on the detected motion range and with reference to the proximity sensor. As shown in FIG. 6, on a basis of the embodiment shown in FIG. 4, step 403 may be replaced with step 403', and other steps remain unchanged.

Step 403': The terminal determines, based on the data detected by the motion sensor, whether a current motion range of the terminal is less than a second threshold, and performs step 404 if the motion range is less than the second threshold, or performs step 405 if the motion range is greater than or equal to the second threshold.

When a user picks up the terminal and places the terminal near an ear to answer a call, there is usually a pick-up action. In this case, a motion range of the terminal is comparatively large. Therefore, if the motion range of the terminal is comparatively small, the terminal is usually not in a state of being picked up to answer a call. In this case, it may be determined that no object is approaching (or an object is far away). For example, the determining whether the motion range of the terminal is less than a second threshold may be as follows: It is determined, based on the motion data (for example, a rotation angle and the motion range) of the terminal, whether the terminal is picked up; and if it is determined that the terminal is picked up, this is equivalent to that the motion range is greater than or equal to the second threshold; or if it is determined that the terminal is not picked up, this is equivalent to that the motion range is less than the second threshold. Content and a value of the second threshold may be determined based on characteristics of the terminal and experimental measurements. This is not limited in this embodiment of this application.

Figure 7A:
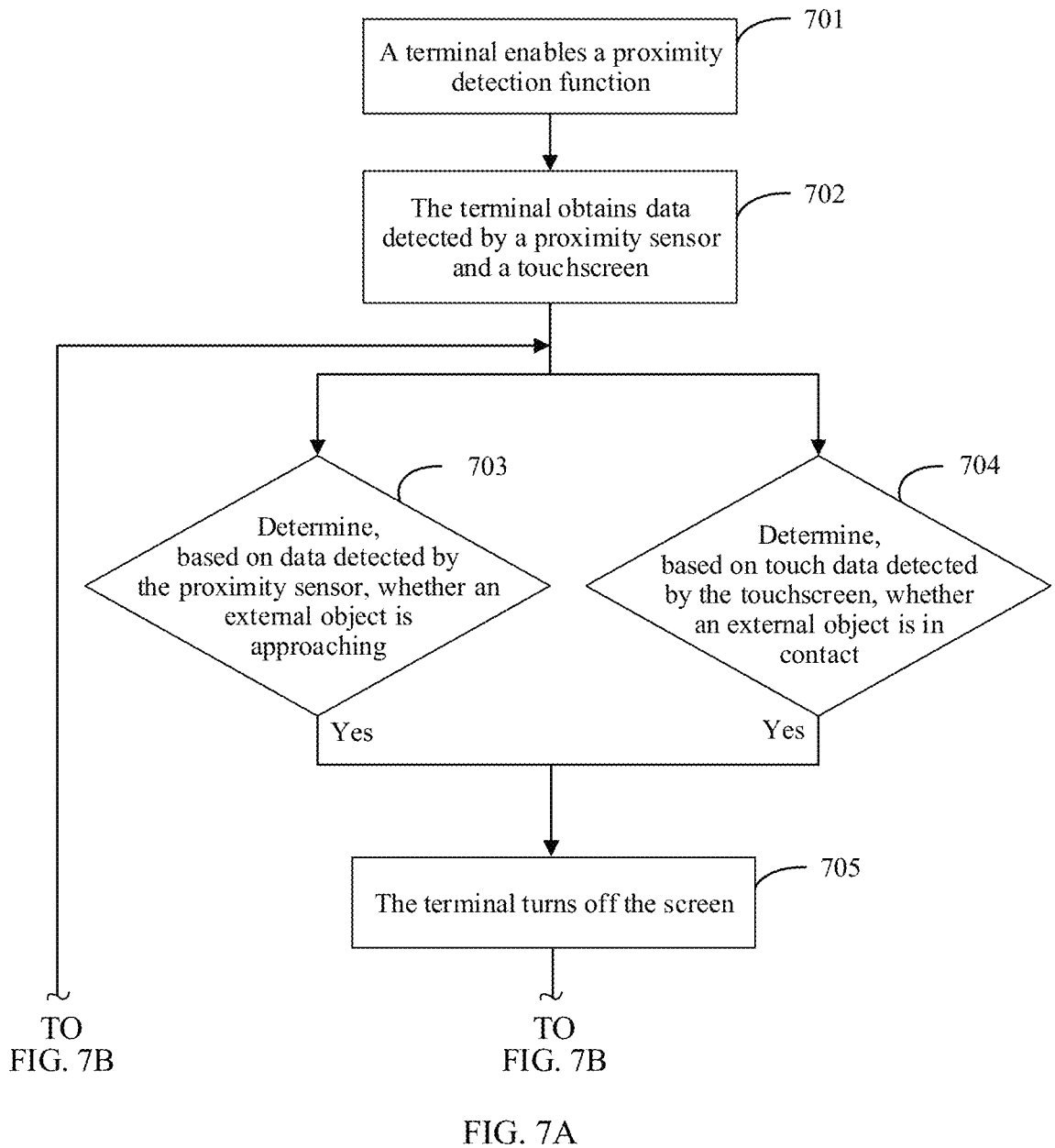
FIG. 7A and FIG. 7B are a flowchart of another method for preventing a proximity mistouch according to an embodiment.
Figure 7B:
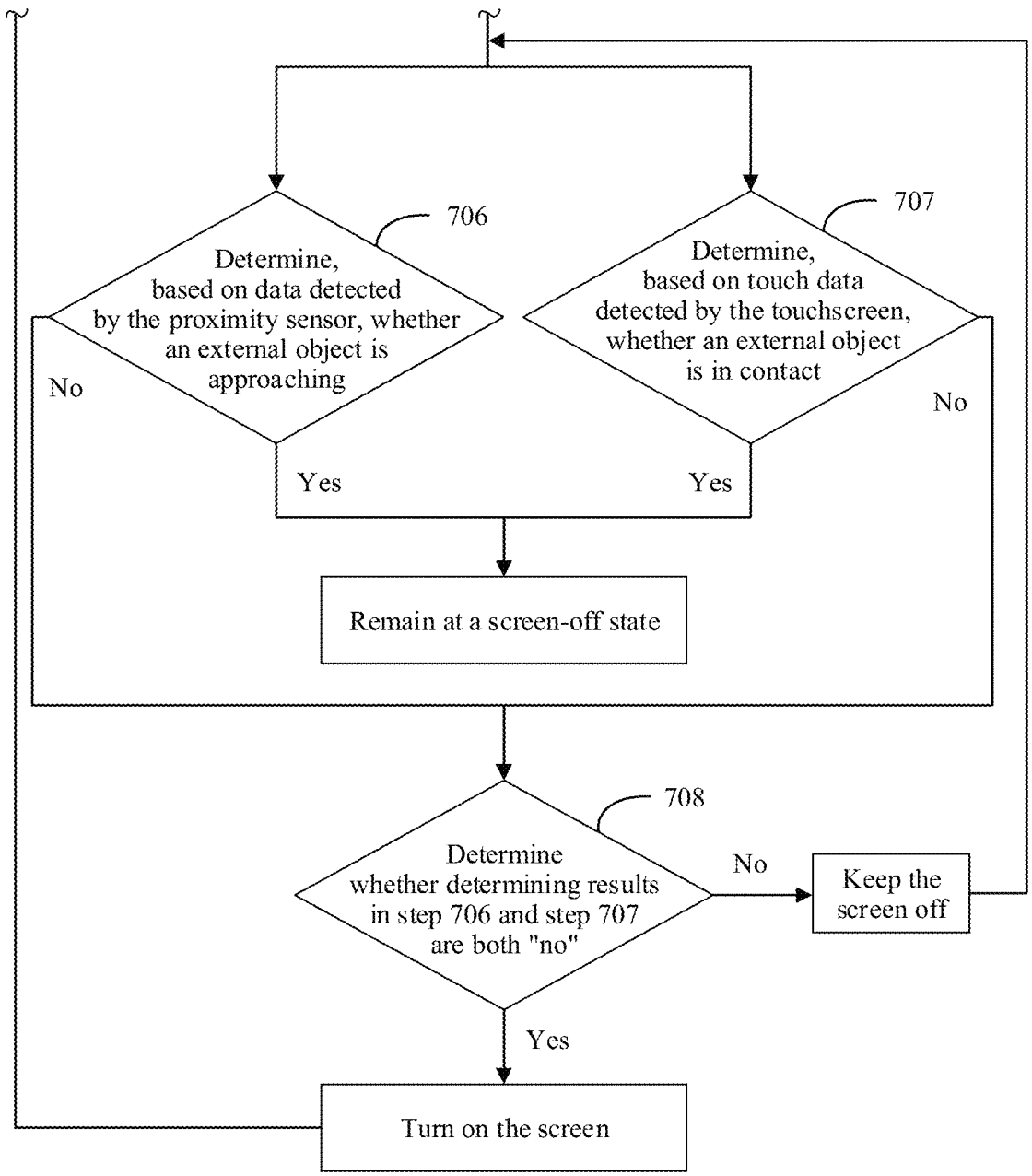

FIG. 7A and FIG. 7B are a flowchart of another method for preventing a proximity mistouch according to an embodiment of this application. It should be noted that all steps in embodiments shown in FIG. 7A to FIG. 9B are performed in a call screen-off scenario. In other words, if a terminal currently does not trigger a call screen-off function, the terminal does not perform a method in an embodiment shown in FIG. 7A, FIG. 7B, FIG. 8A, FIG. 8B, FIG. 9A or FIG. 9B. In the solution of this embodiment, proximity detection is mainly implemented through cooperation between a touchscreen and a proximity sensor. This can effectively avoid the misjudgment described in the foregoing scenario 2. As shown in FIG. 7 A and FIG. 7B, the method may include the following steps.

Step 701: The terminal enables a proximity detection function. This step is similar to step 401. For details, refer to the descriptions in the foregoing embodiment. This embodiment is usually applied to a call screen-off scenario. For example, the terminal may enable the proximity detection function when either of the following two conditions is met. Condition 1: The terminal answers an incoming call in response to a user operation. Condition 2: The terminal initiates a call as a calling party in response to a user operation. When the proximity detection function is enabled on the terminal, the terminal is in a screen-on state.

Step 702: After the proximity detection function is enabled, the terminal obtains data detected by the proximity sensor and the touchscreen, and then performs steps 703 and 704.

The proximity sensor may have been enabled before step 701, or may be enabled in step 701. An occasion at which the proximity sensor is enabled is not limited in this application. After step 701, the terminal obtains data detected by the proximity sensor.

In this embodiment, data detected by the touchscreen may be touch data generated when a user touches the touchscreen, that is, when the user is in contact with the touchscreen, the touchscreen may detect which points on the screen are touched by the user. Different touch data is generated when different parts of the user touch the touchscreen. For example, touch data generated when the user performs an operation on the touchscreen by using a finger is different from touch data generated when an ear or a face of the user is in contact with the touchscreen. Some touch data models may be preset on the terminal to indicate different parts of the user. For example, a touch data model 1 is touch data generated when a finger of the user touches the screen, a touch data model 2 is touch data generated when an ear of the user is in contact with the touchscreen, a touch data model 3 is touch data generated when the face of the user is in contact with the touchscreen, and a touch data model 4 is touch data generated when both an ear and the face (which may include a head) of the user are in contact with the touchscreen. Touch data or a touch data model may include an area and an outline of a touch. The terminal compares touch data detected by the touchscreen with a preset touch data model, to obtain a type of the touch data. If the touch data matches the touch data model 1, it indicates that a finger of the user is in contact with the touchscreen. If the touch data matches the touch data model 2, the touch data model 3, or the touch data model 4, it indicates that an ear and/or the face of the user are/is in contact with the touchscreen.

When the terminal is in a screen-on or unlocked state, a detection function of the touchscreen is usually enabled, that is, the touchscreen can detect touch data.

Step 703: The terminal determines, based on the data detected by the proximity sensor, whether an external object is approaching, and performs step 705 if an object is approaching.

Step 704: The terminal determines, based on the touch data detected by the touchscreen, whether an external object is in contact, and performs step 705 if an object is in contact.

When no external object is in contact with the touchscreen, the touchscreen cannot detect touch data. In this case, it is determined that no object is approaching. If the touchscreen detects touch data, the terminal matches the detected touch data against a preset touch data model. If the touch data matches a preset touch data model for an ear or a face, it is determined that an object is in contact, that is, proximity is reported. If the touch data matches a preset touch data model for a finger, it is determined that no object is in contact, that is, being far away is reported.

A sequence of step 703 and step 704 is not limited in this embodiment, and the two steps may be alternatively performed simultaneously.

Step 705: The terminal turns off the screen, and then performs step 706 and step 707.

Step 706: The terminal determines, based on data detected by the proximity sensor, whether an external object is approaching, and remains at a screen-off state if an object is approaching, or performs step 708 if no object is approaching.

Step 707: The terminal determines, based on touch data detected by the touchscreen, whether an external object is in contact, and remains at a screen-off state if an object is in contact, or performs step 708 if no object is in contact, that is, an object is far away.

After the operation of turning off the screen is performed in step 705, the touchscreen module of the terminal is not powered off or hibernated, but still detects a contact report feature of the touchscreen in the screen-off state.

Step 708: Determine whether determining results in step 706 and step 707 are both that no object is approaching or no object is in contact, that is, whether the determining results are both "no"; and if yes, that is, it is reported that no object is approaching in step 706, and it is reported that no object is in contact in step 707, turn on the screen, and repeat step 703 and step 704; or if no, that is, it is reported that no object is approaching or no object is in contact only in one of step 706 and step 707, remain at the screen-off state, and repeat step 706 and step 707.

It should be noted that, when the terminal determines that an object is far away and the screen needs to be turned on, the terminal may perform a screen-on operation after a delay of a specific time. If the terminal determines again within the delay time that an object is approaching, the terminal remains at the screen-off state.

In a scenario in which a user holds the terminal near an ear to make a call, when the proximity sensor does not detect proximity of a head of the user due to a first included angle, if the head (an ear or a face) of the user is in contact with the touchscreen, the terminal may identify that an object is approaching, and further turn off the screen. This can prevent the touchscreen from being accidentally touched, and can further reduce power consumption of the terminal. In this embodiment, the misjudgment in the foregoing scenario 2 can be avoided through cooperation between the proximity sensor and the touchscreen.

Figure 8A:
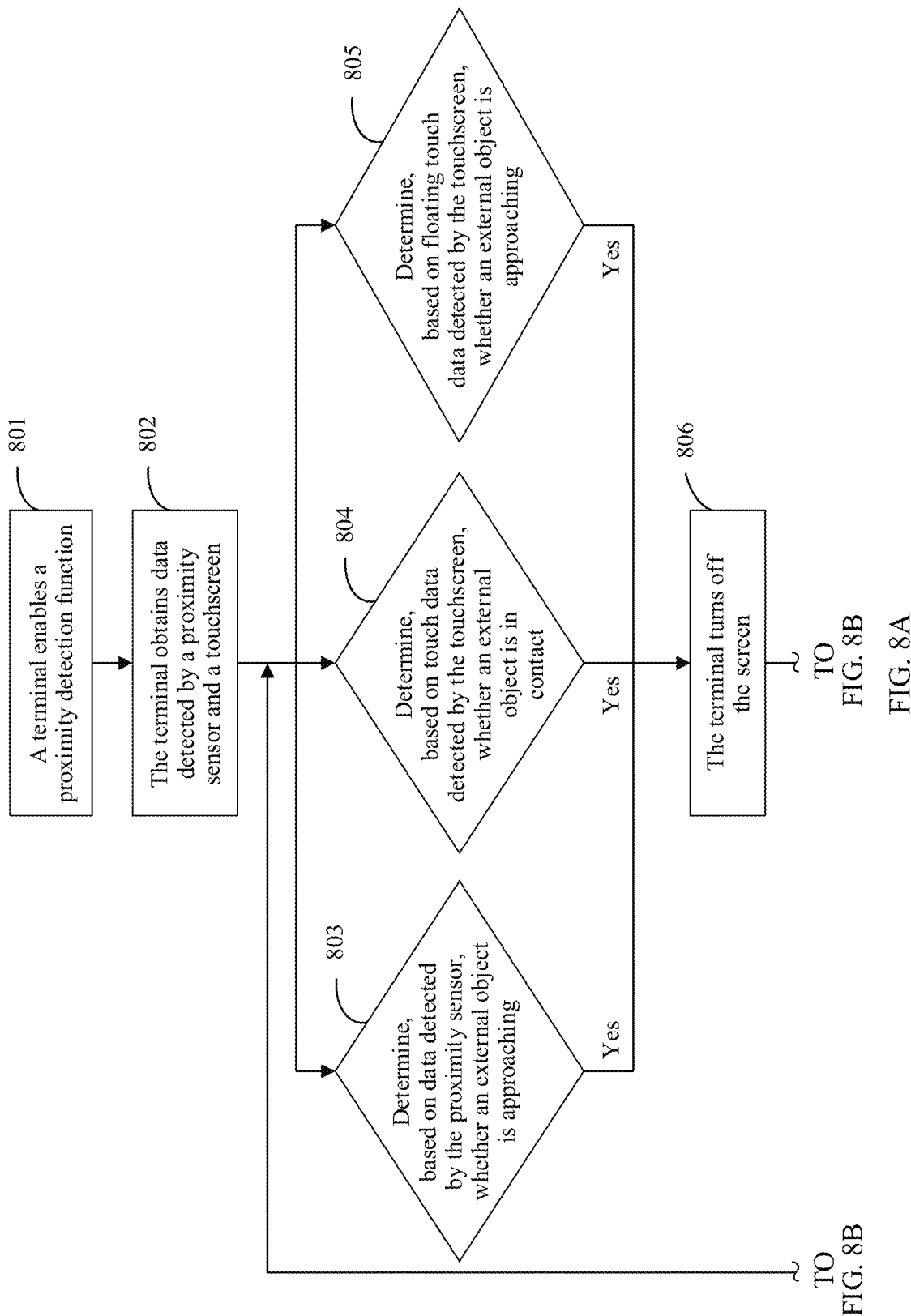
FIG. 8A and FIG. 8B are a flowchart of another method for preventing a proximity mistouch according to an embodiment.
Figure 8B:
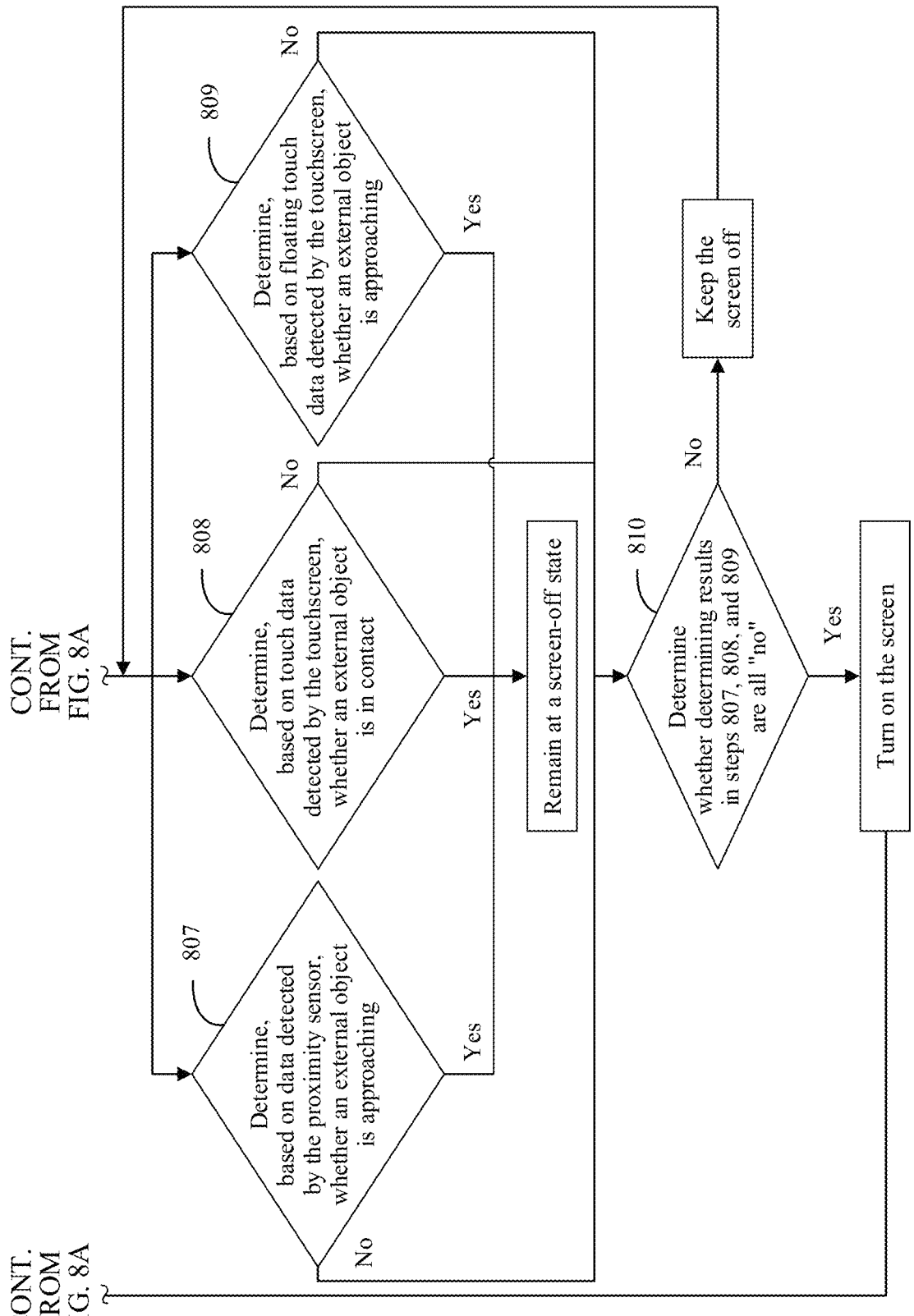

Further, touchscreens of some terminals have a floating touch function. For such a terminal, this application provides another embodiment. FIG. 8A and FIG. 8B are a flowchart of another method for preventing a proximity mistouch according to an embodiment of this application. In this embodiment, for a terminal with a floating touch function, the embodiment shown in FIG. 7A and FIG. 7B is improved. As shown in FIG. 8A and FIG. 8B, the method includes the following steps.

Step 801: The terminal enables a proximity detection function. This step is the same as step 701.

Step 802: After the proximity detection function is enabled, the terminal obtains data detected by a proximity sensor and a touchscreen, and then performs steps 803, 804, and 805.

Different from that in step 702, data detected by the touchscreen and obtained by the terminal includes touch data and floating touch data. For the touch data, refer to the descriptions in the foregoing step 702. The floating touch data is data obtained after the terminal learns, based on the floating touch function, that an external object is approaching. It should be noted that the terminal may not enable a full-screen floating touch, but may enable a floating touch only in a specific region at the top of the mobile phone.

Step 803: The terminal determines, based on data detected by the proximity sensor, whether an external object is approaching, and performs step 806 if an object is approaching.

Step 804: The terminal determines, based on the touch data detected by the touchscreen, whether an external object is in contact, and performs step 806 if an object is in contact.

Step 805: The terminal determines, based on the floating touch data detected by the touchscreen, whether an external object is approaching, and performs step 806 if an object is approaching.

Step 806: The terminal turns off the screen, and then performs steps 807, 808, and 809.

Step 807: The terminal determines, based on data detected by the proximity sensor, whether an external object is approaching, and remains at a screen-off state if an object is approaching, or performs step 810 if no object is approaching, that is, an object is far away.

Step 808: The terminal determines, based on touch data detected by the touchscreen, whether an external object is in contact, and remains at a screen-off state if an object is in contact, or performs step 810 if no object is in contact, that is, an object is far away.

Step 809: The terminal determines, based on floating touch data detected by the touchscreen, whether an external object is approaching, and remains at a screen-off state if an object is approaching, or performs step 810 if no object is approaching, that is, an object is far away.

Step 810: Determine whether determining results in steps 807, 808, and 809 are all that no object is approaching or no object is in contact, that is, determine whether the three determining results are all "no"; and if yes, that is, it is reported that no object is approaching in both steps 807 and 809, and it is reported that no object is in contact in step 808, turn on the screen, and repeat steps 803, 804, and 805; or if no, that is, it is reported that no object is approaching or no object is in contact only in one or two of steps 807, 808, and 809, remain at the screen-off state, and repeat steps 807, 808, and 809.

Likewise, in this embodiment, the misjudgment in the foregoing scenario 2 can be avoided through cooperation between the proximity sensor and the touchscreen. It should be noted that, even for the terminal with the floating touch, proximity determining in a call scenario may be performed by using the embodiment shown in FIG. 7A and FIG. 7B alone.

Figure 9A:
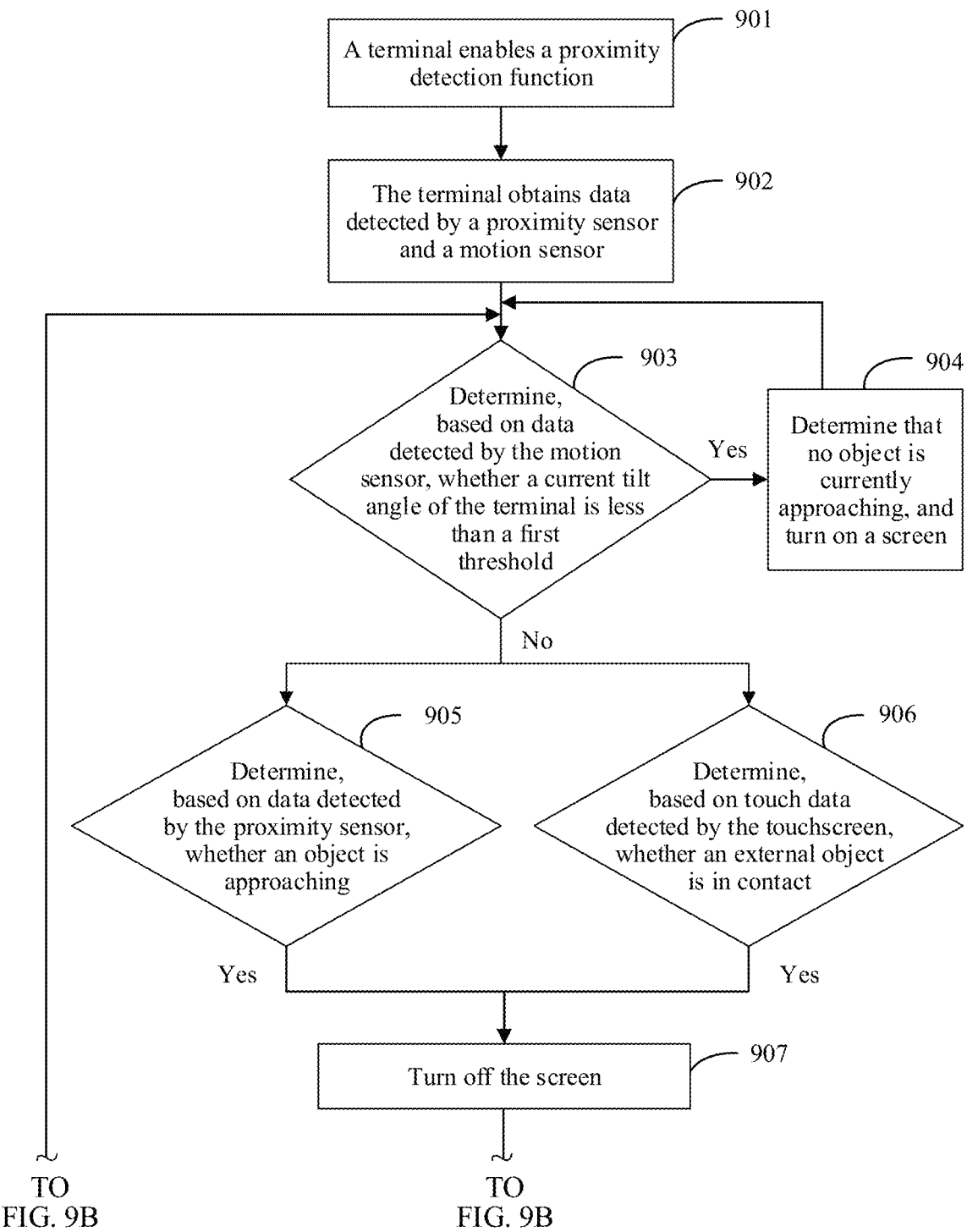
FIG. 9A and FIG. 9B are a flowchart of another method for preventing a proximity mistouch according to an embodiment.
Figure 9B:
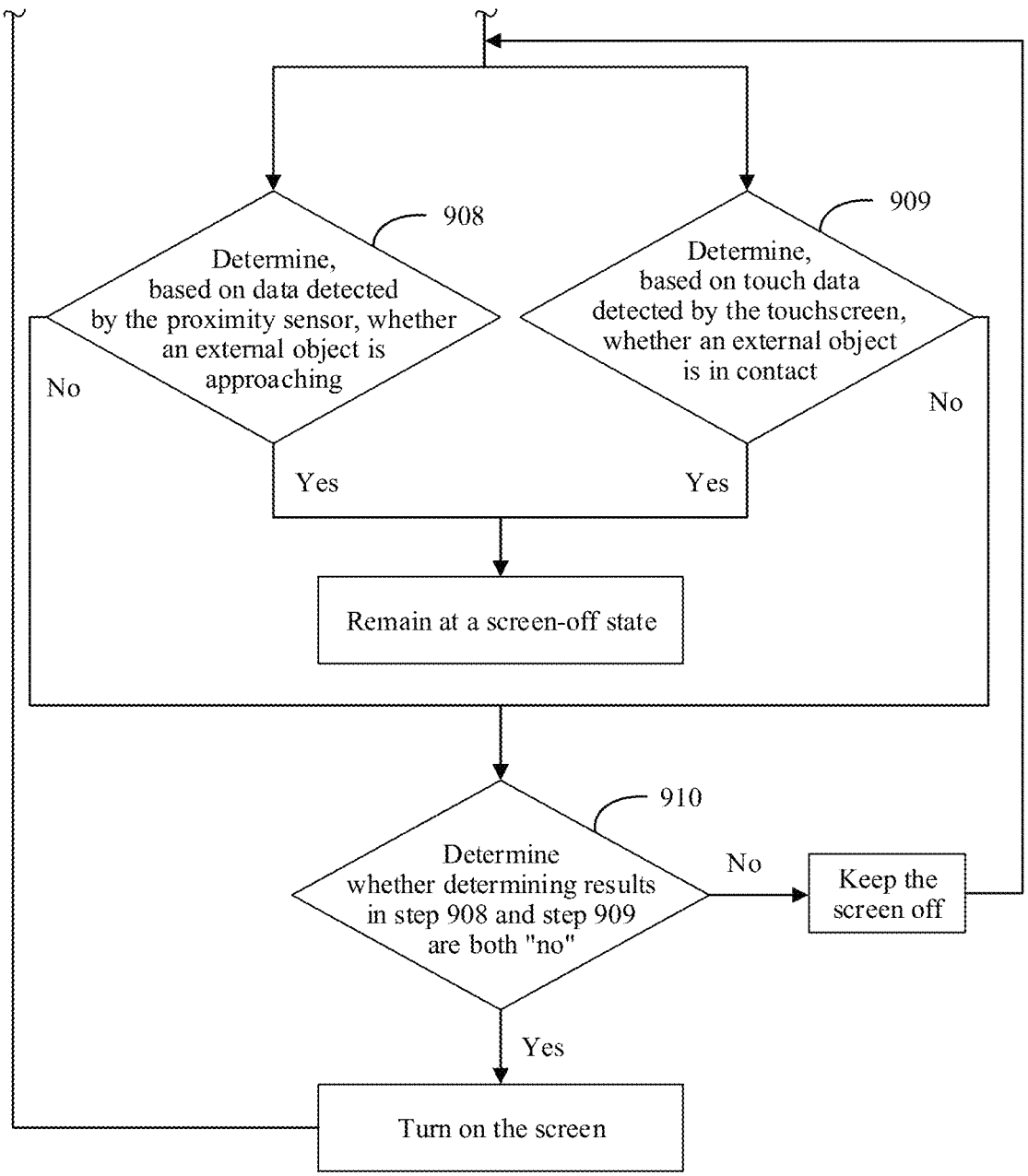

Further, to effectively avoid the misjudgment shown in the foregoing scenario 1 and scenario 2, that is, to avoid a misjudgment of the terminal to a greatest extent, as shown in FIG. 9A and FIG. 9B, an embodiment of this application provides another implementation with reference to FIG. 4, FIG. 7A and FIG. 7B. In the solution of this embodiment, proximity detection is implemented through cooperation between a motion sensor, a touchscreen, and a proximity sensor, and the solution may be mainly applied to a call screen-off scenario. As shown in FIG. 9A and FIG. 9B, the method includes the following steps.

Step 901: The terminal enables a proximity detection function. This step is the same as step 701.

Step 902: After the proximity detection function is enabled, the terminal obtains data detected by the proximity sensor and the motion sensor.

Step 903: The terminal determines, based on data detected by the motion sensor, whether a current tilt angle of the terminal is less than a first threshold, and performs step 904 if the tilt angle is less than the first threshold, or performs steps 905 and 906 if the tilt angle is greater than or equal to the first threshold.

Step 904: The terminal determines that no object is currently approaching, and keeps the screen on, and then repeats step 903 to perform, in real time, determining on data detected by the motion sensor.

Steps 902 to 904 are the same as steps 402 to 404 respectively.

Step 905: The terminal determines, based on data detected by the proximity sensor, whether an external object is approaching, and performs step 907 if an object is approaching.

Step 906: The terminal determines, based on touch data detected by the touchscreen, whether an external object is in contact, and performs step 907 if an object is in contact.

Steps 905 and 906 are the same as steps 704 and 705 respectively.

Step 907: The terminal turns off the screen, and then performs step 908 and step 909.

Step 908: The terminal determines, based on data detected by the proximity sensor, whether an external object is approaching, and remains at a screen-off state if an object is approaching, or performs step 910 if no object is approaching, that is, an object is far away.

Step 909: The terminal determines, based on touch data detected by the touchscreen, whether an external object is in contact, and remains at a screen-off state if an object is in contact, or performs step 910 if no object is in contact, that is, an object is far away.

Step 910: Determine whether determining results in step 908 and step 909 are both that no object is approaching or no object is in contact, that is, whether the determining results in the two steps are both "no"; and if yes, turn on the screen, and repeat step 903; or if no, remain at the screen-off state, and repeat step 908 and step 909.

It should be noted that, in an implementation, the terminal may detect a current tilt angle in real time. Provided that the terminal detects that the tilt angle is less than the first threshold, the terminal determines that a current status is that an object is far away (that is, no object is approaching), and then turns on the screen. In other words, regardless of which step is performed, the terminal turns on the screen, provided that the terminal detects that the current tilt angle is less than the first threshold. In this implementation, step 910 may be replaced as follows: Determine whether determining results in step 908 and step 909 are both "no"; and if yes, turn on the screen, and repeat step 903; or if no, remain at the screen-off state, and repeat step 903.

In another implementation, when detecting that the tilt angle is less than the first threshold, the terminal also needs to determine whether the touchscreen has touch data indicating that an object is approaching (or in contact). If the tilt angle is less than the first threshold and the touchscreen does not detect touch data indicating proximity, the terminal determines that an object is far away; or if the tilt angle is less than the first threshold but the touchscreen detects touch data indicating proximity, the terminal determines that an object is approaching. That is, step 904 may be replaced with 904'. Specifically, step 904' is as follows: The terminal further determines, based on touch data detected by the touchscreen, whether an external object is in contact; and performs step 907 if an object is in contact; or if no object is in contact, determines that no object is currently approaching, keeps the screen on, and then repeats step 903 to perform, in real time, determining on data detected by the motion sensor.

With reference to the embodiments shown in FIG. 4, FIG. 8A and FIG. 8B, the embodiment shown in FIG. 9A and FIG. 9B may be further improved. Specifically, in the embodiment shown in FIG. 9A and FIG. 9B, step 906 may be replaced with step 906A and step 906B, and step 909 may be replaced with step 909A and step 909B. Details are as follows.

Step 906A: The terminal determines, based on touch data detected by the touchscreen, whether an external object is in contact, and performs step 907 if an object is in contact.

Step 906B: The terminal determines, based on floating touch data detected by the touchscreen, whether an external object is approaching, and performs step 907 if an object is approaching.

Step 909A: The terminal determines, based on touch data detected by the touchscreen, whether an external object is in contact, and remains at a screen-off state if an object is in contact, or performs step 910 if no object is in contact, that is, an object is far away.

Step 909B: The terminal determines, based on floating touch data detected by the touchscreen, whether an external object is approaching, and remains at a screen-off state if an object is approaching, or performs step 910 if no object is approaching, that is, an object is far away.

Likewise, in this embodiment, the terminal may detect a current tilt angle in real time. Provided that the terminal detects that the tilt angle is less than the first threshold, the terminal determines that a current status is that an object is far away (that is, no object is approaching), and then keeps the screen on or turns on the screen. Alternatively, when detecting that the tilt angle is less than the first threshold, the terminal may further determine whether there is touch data indicating that an object is approaching (or in contact). If the tilt angle is less than the first threshold and the touchscreen does not detect touch data indicating proximity, the terminal determines that an object is far away, and keeps the screen on or turns on the screen; or if the tilt angle is less than the first threshold but the touchscreen detects touch data indicating proximity, the terminal determines that an object is approaching, and keeps the screen off or turns off the screen.

It can be understood that, to implement the foregoing functions, the terminal includes corresponding hardware structures and/or software modules for performing the functions. A person skilled in the art should easily be aware that, in combination with the examples described in the embodiments disclosed in this specification, units, algorithm steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments of this application.

In the embodiments of this application, functional modules of the terminal may be divided based on the foregoing method examples. For example, the functional modules may be divided based on the functions, or at least two functions may be integrated in one processing module. The foregoing integrated module may be implemented in a form of hardware, or may be implemented in a form of a software functional module. It should be noted that, in the embodiments of this application, module division is an example, and is merely logical function division and may be other division in actual implementation.

Figure 10:
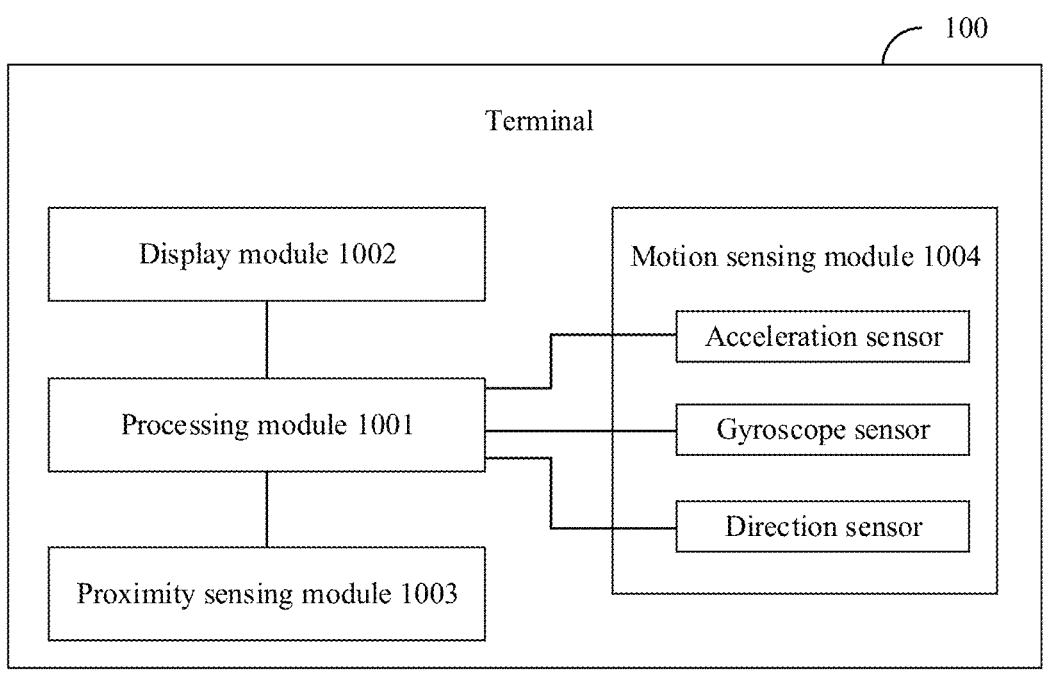
FIG. 10 is a schematic structural composition diagram of a terminal according to an embodiment.

When the integrated unit is used, FIG. 10 shows one schematic structural diagram of the terminal 100 in the foregoing embodiments. The terminal 100 may include a processing module 1001, a display module 1002, a proximity sensing module 1003, and a motion sensing module 1004. In some embodiments, the terminal 100 may further include a communications module, and the communications module includes an RF module, a Bluetooth module, a Wi-Fi module, and the like.

The processing module 1001 is configured to control and manage an action of the terminal 100. The display module 1002 is configured to display image content or receive an input operation of a user. The proximity sensing module 1003 is configured to detect proximity of an external object. The motion sensing module 1004 is configured to detect a motion status of the terminal. The communications module is used for the terminal 100 to communicate with another device.

Specifically, the processing module 1001 may be configured to support the terminal 100 in performing steps 401 to 406, 403', 701 to 708, 801 to 810, 901 to 910, 904', 906A, 906B, 909A, and 909B in the foregoing method embodiments, and/or another process used for the technology described in this specification. The display module 1002 may be configured to: when the terminal 100 performs the foregoing method embodiments, support the terminal 100 in detecting touch data or floating touch data, and reporting the detected data to the processing module 1001. The proximity sensing module 1003 may be configured to: when the terminal 100 performs the foregoing method embodiments, support the terminal 100 in detecting proximity of an external object by transmitting/receiving infrared light, and reporting a detection result to the processing module 1001. The motion sensing module 1004 may be configured to: when the terminal 100 performs the foregoing method embodiments, support the terminal 100 in detecting a motion status of the terminal, and reporting a detection result to the processing module 1001.

Certainly, unit modules in the terminal 100 include but are not limited to the processing module 1001, the display module 1002, the proximity sensing module 1003, the motion sensing module 1004, and the like. For example, the terminal 100 may further include a storage module. The storage module may be configured to store program code and data.

The processing module 1001 may be equivalent to the processor 110 in the embodiment shown in FIG. 1, or the processing module 1001 may be included in the processor 110. The display module 1002 may be equivalent to the touchscreen in the embodiment shown in FIG. 1. The proximity sensing module 1003 may be equivalent to the proximity sensor 40 or the proximity sensor 180G in the foregoing embodiments. The motion sensing module 1004 may be equivalent to one or more of the acceleration sensor 180E, the gyroscope sensor 180B, and the direction sensor, and the like in the foregoing embodiments.

An embodiment of this application further provides a computer storage medium. The computer storage medium stores computer program code. When the computer program code is executed, the terminal 100 performs a related method in any one of the embodiments in FIG. 4, and FIG. 6 to FIG. 9B.

An embodiment of this application further provides a computer program product. When the computer program product runs on a computer, the computer is enabled to perform a related method in any one of the embodiments in FIG. 4, and FIG. 6 to FIG. 9B.

The terminal 100, the computer storage medium, and the computer program product provided in the embodiments of this application are all configured to perform the corresponding methods provided in the foregoing descriptions. Therefore, for beneficial effects that can be achieved by the terminal 100, the computer storage medium, and the computer program product, refer to the beneficial effects of the corresponding methods provided in the foregoing descriptions. Details are not described herein again.

The foregoing descriptions about the implementations allow a person skilled in the art to clearly understand that, for the purpose of convenient and brief description, division of the foregoing functional modules is taken as an example for illustration. In actual application, the foregoing functions can be allocated to different modules and implemented based on a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

In addition, functional units in the embodiments of this application may be integrated into one processing unit, or each of the units may exist alone physically, or two or more units are integrated into one unit. The foregoing integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of this application essentially, or the part contributing to the prior art, or all or some of the technical solutions may be implemented in the form of a software product. The software product is stored in a storage medium and includes several instructions for instructing a device (which may be a single-chip microcomputer, a chip, or the like) or a processor (processor) to perform all or some of the steps of the methods described in the embodiments of this application. The foregoing storage medium includes: any medium that can store program code, such as a USB flash drive, a removable hard disk, a ROM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method for preventing a proximity mistouch, applied to a terminal comprising a touchscreen, a proximity sensor, and a motion sensor, wherein a first included angle is formed between light emitted by the proximity sensor and the touchscreen, and the method comprises:

obtaining, by the terminal, data detected by the motion sensor;

obtaining, by the terminal, motion data of the terminal based on the data detected by the motion sensor, wherein the motion data comprises a tilt angle of the terminal, and the tilt angle of the terminal is an included angle between the terminal and a horizontal plane;

determining, by the terminal, whether the tilt angle is less than a first threshold;

when the tilt angle is less than the first threshold, determining, by the terminal, that no external object is currently approaching; and when the tilt angle is greater than or equal to the first threshold, determining, by the terminal based on data detected by the proximity sensor, whether an external object is approaching, wherein the proximity sensor is located at a side edge of the terminal that is on a first plane, wherein the touchscreen of the terminal is on a second plane, and wherein the first plane and the second plane are different and non-parallel.

2. The method of claim 1, wherein the method further comprises:

when the tilt angle is greater than or equal to the first threshold, determining, by the terminal based on touch data detected by the touchscreen, whether an external object is approaching;

when either the data detected by the proximity sensor or the touch data detected by the touchscreen indicates that an external object is approaching, turning off, by the terminal, the screen; and before the obtaining, by the terminal, motion data detected by the motion sensor, answering, by the terminal, an incoming call, or initiating, by the terminal, a call in response to a user operation.

3. The method of claim 1, wherein after turning off, by the terminal, the screen, the method further comprises:

continuing to determine, by the terminal based on the data detected by the proximity sensor, whether an external object is approaching, and if an external object is approaching, keeping the screen off;

continuing to determine, by the terminal based on touch data detected by the touchscreen, whether an external object is in contact;

when an external object is in contact, keeping the screen off; and when the data detected by the proximity sensor indicates that no external object is approaching, and the touch data detected by the touchscreen indicates that no external object is in contact, turning on, by the terminal, the screen.

4. The method of claim 2, wherein the method further comprises:

when the tilt angle is greater than or equal to the first threshold, determining, by the terminal based on floating touch data detected by the touchscreen, whether an external object is approaching; and when the floating touch data detected by the touchscreen indicates that an external object is approaching, turning off, by the terminal, the screen.

5. The method of claim 4, wherein after turning off, by the terminal, the screen, the method further comprises:

continuing to determine, by the terminal based on the data detected by the proximity sensor, whether an external object is approaching, and if an external object is approaching, keeping the screen off;

continuing to determine, by the terminal based on the touch data detected by the touchscreen, whether an external object is in contact, and if an external object is in contact, keeping the screen off;

continuing to determine, by the terminal based on the floating touch data detected by the touchscreen, whether an external object is approaching;

when an external object is approaching, keeping the screen off; and when the data detected by the proximity sensor indicates that no external object is approaching, the touch data detected by the touchscreen indicates that no external object is in contact, and the floating touch data detected by the touchscreen indicates that no external object is approaching, turning on, by the terminal, the screen.

6. The method of claim 1, wherein the tilt angle of the terminal is an included angle between the horizontal plane and a plane at which the terminal is located along a direction of the touchscreen.

7. The method of claim 1, wherein the motion data comprises a motion range of the terminal.

8. The method of claim 1, wherein before obtaining, by the terminal, the motion data detected by the motion sensor, the method further comprises: triggering, by the terminal, a pocket mistouch prevention function.

9. The method of claim 1, wherein the first threshold is any angle ranging from 30 degree to 45 degree.

10. The method of claim 1, wherein the first included angle is any angle ranging from 25 degree to 60 degree.

11. The method of claim 1, wherein the proximity sensor is located at a top side edge of the terminal.

12. A terminal, comprising:

a touchscreen;

a proximity sensor located at a side edge of the terminal that is on a first plane, wherein the touchscreen of the terminal is on a second plane, wherein the first plane and the second plane are different and non-parallel, wherein a first included angle is formed between light emitted by the proximity sensor and the touchscreen, and wherein the proximity sensor is configured to detect whether an object is approaching;

a motion sensor configured to detect motion data of the terminal; and a processor separately coupled to the proximity sensor, the motion sensor, and the touchscreen, wherein the processor is configured to:

obtain the motion data of the terminal by using the motion sensor, wherein the motion data comprises a tilt angle of the terminal, and the tilt angle of the terminal is an included angle between the terminal and a horizontal plane;

determine whether the tilt angle is less than a first threshold;

when the tilt angle is less than the first threshold, determine that no external object is currently approaching; and when the tilt angle is greater than or equal to the first threshold, determine, based on data detected by the proximity sensor, whether an external object is approaching.

13. The terminal of claim 12, wherein the processor is further configured to:

when the tilt angle is greater than or equal to the first threshold, further determine, based on touch data detected by the touchscreen, whether an external object is approaching;

when either the data detected by the proximity sensor or the touch data detected by the touchscreen indicates that an external object is approaching, control the terminal to turn off the screen; and before obtaining the motion data of the terminal by using the motion sensor, the processor is further configured to: answer an incoming call, or initiate a call in response to a user operation.

14. The terminal of claim 12, wherein after controlling the terminal to turn off the screen, the processor is further configured to:

continue to determine, based on the data detected by the proximity sensor, whether an external object is approaching, and if an external object is approaching, keep the screen off;

continue to determine, based on touch data detected by the touchscreen, whether an external object is in contact;

when an external object is in contact, keep the screen off; and when the data detected by the proximity sensor indicates that no external object is approaching, and the touch data detected by the touchscreen indicates that no external object is in contact, control the terminal to turn on the screen.

15. The terminal of claim 13, wherein the processor is further configured to:

when the tilt angle is greater than or equal to the first threshold, determine, based on floating touch data detected by the touchscreen, whether an external object is approaching; and when the floating touch data detected by the touchscreen indicates that an external object is approaching, control the terminal to turn off the screen.

16. The terminal of claim 15, wherein after controlling the terminal to turn off the screen, the processor is further configured to:

continue to determine, based on the data detected by the proximity sensor, whether an external object is approaching, and if an external object is approaching, keep the screen off;

continue to determine, based on the touch data detected by the touchscreen, whether an external object is in contact, and if an external object is in contact, keep the screen off;

continue to determine, based on the floating touch data detected by the touchscreen, whether an external object is approaching;

when an external object is approaching, keep the screen off; and when the data detected by the proximity sensor indicates that no external object is approaching, the touch data detected by the touchscreen indicates that no external object is in contact, and the floating touch data detected by the touchscreen indicates that no external object is approaching, control the terminal to turn on the screen.

17. The terminal of claim 12, wherein the tilt angle of the terminal is an included angle between the horizontal plane and a plane at which the terminal is located along a direction of the touchscreen.

18. A non-transitory computer readable storage medium storing a computer program comprising one or more instructions configured for execution by one or more processors of an terminal, wherein the terminal comprises a touchscreen, a proximity sensor, and a motion sensor, wherein a first included angle is formed between light emitted by the proximity sensor and the touchscreen, wherein the instructions, when executed by the one or more processors, cause the terminal to be configured to:

obtain, by the terminal, data detected by the motion sensor;

obtain, by the terminal, motion data of the terminal based on the data detected by the motion sensor, wherein the motion data comprises a tilt angle of the terminal, and the tilt angle of the terminal is an included angle between the terminal and a horizontal plane;

determine, by the terminal, whether the tilt angle is less than a first threshold;

when the tilt angle is less than the first threshold, determine, by the terminal, that no external object is currently approaching; and when the tilt angle is greater than or equal to the first threshold, determine, by the terminal based on data detected by the proximity sensor, whether an external object is approaching, wherein the proximity sensor is located at a side edge of the terminal that is on a first plane, wherein the touchscreen of the terminal is on a second plane, and wherein the first plane and the second plane are different and non-parallel.

* * * * *